US012323959B2

(12) United States Patent
Ioffe et al.

(10) Patent No.: US 12,323,959 B2
(45) Date of Patent: *Jun. 3, 2025

(54) TRANSMISSION DELAY COMPENSATION FOR INTRA-FREQUENCY BAND COMMUNICATION

(71) Applicant: Apple Inc., Cupertino, CA (US)

(72) Inventors: Anatoliy Sergey Ioffe, Sunnyvale, CA (US); Elmar Wagner, Taufkirchen (DE); Jan M. Zaleski, Altenberg bei Linz (AT); Jie Cui, San Jose, CA (US); Yang Tang, San Jose, CA (US); Andre Hanke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/236,206

(22) Filed: Aug. 21, 2023

(65) Prior Publication Data

US 2023/0397177 A1    Dec. 7, 2023

Related U.S. Application Data

(63) Continuation of application No. 17/846,943, filed on Jun. 22, 2022, now Pat. No. 11,751,182, which is a
(Continued)

(51) Int. Cl.
*H04L 41/0803* (2022.01)
*H04L 43/0852* (2022.01)
(Continued)

(52) U.S. Cl.
CPC ..... *H04W 72/0453* (2013.01); *H04L 41/0803* (2013.01); *H04L 43/0852* (2013.01);
(Continued)

(58) Field of Classification Search
CPC .......... H04B 1/12–126; H04B 7/02–12; H04B 17/0082–3913; H04J 3/0682;
(Continued)

(56) References Cited

U.S. PATENT DOCUMENTS 11,395,296 B2 * 7/2022 Ioffe ................. H04W 72/0453
11,751,182 B2 * 9/2023 Ioffe ................. H04W 72/0453
(Continued)

FOREIGN PATENT DOCUMENTS

CN      101635619 A      1/2010
CN      104365031 A      2/2015
(Continued)

OTHER PUBLICATIONS

Intel Corporation, R4-1801777, "Discussion on MRTD requirements for V2X CA"; 3GPP tsg_ranWG4_radio, TSGR4_86; Feb. 20, 2018;.
(Continued)

*Primary Examiner* — Timothy J Weidner
(74) *Attorney, Agent, or Firm* — FLETCHER YODER PC

(57) ABSTRACT

The present disclosure relates to systems and methods for operating transceiver circuitry to transmit or receive signals on various frequency ranges. To do so, an electronic device may determine a receive delay between one or more messages received on different component carriers and may transmit the receive delay to a base station to update how communications are transmitted on one of the component carriers. The update made to at least one of the component carriers may compensate for the receive delay between the different component carriers. Compensating for the receive delay may improve operations that delay downlink communications to reduce a likelihood or stop simultaneous downlink and uplink communications by further adjusting for delays seen at an electronic device when communicating
(Continued)

with base stations disposed at a different distances from the electronic device.

20 Claims, 17 Drawing Sheets

Related U.S. Application Data continuation of application No. 16/917,359, filed on Jun. 30, 2020, now Pat. No. 11,395,296.

(60) Provisional application No. 62/975,445, filed on Feb. 12, 2020.

(51) Int. Cl.
| | |
|---|---|
| *H04W 8/22* | (2009.01) |
| *H04W 24/08* | (2009.01) |
| *H04W 24/10* | (2009.01) |
| *H04W 56/00* | (2009.01) |
| *H04W 72/0453* | (2023.01) |
| *H04W 72/21* | (2023.01) |
| *H04W 72/23* | (2023.01) |
| *H04W 72/542* | (2023.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .............. *H04W 8/22* (2013.01); *H04W 24/08* (2013.01); *H04W 24/10* (2013.01); *H04W 56/0015* (2013.01); *H04W 56/003* (2013.01); *H04W 72/21* (2023.01); *H04W 72/23* (2023.01); *H04W 72/542* (2023.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC . H04J 11/0023–0093; H04J 2011/0003–0096; H04L 5/0001–26; H04L 41/08–0896; H04L 43/0852–087; H04L 43/16; H04W 8/22–245; H04W 24/02–10; H04W 48/02–20; H04W 56/0005–0095; H04W 72/02–569; H04W 74/002–0891; H04W 84/005–16; H04W 88/005–12; H04W 92/02–04; H04W 92/10
See application file for complete search history.

(56) References Cited

U.S. PATENT DOCUMENTS

| | | | |
|---|---|---|---|
| 2012/0087257 A1* | 4/2012 | Larsson | H04W 36/0072 |
| 2013/0329665 A1 | 12/2013 | Kadous et al. | |
| 2014/0355525 A1 | 12/2014 | Barzegar et al. | |
| 2016/0270139 A1 | 9/2016 | Rahman et al. | |
| 2017/0054470 A1 | 2/2017 | Reza et al. | |
| 2017/0366313 A1 | 12/2017 | Rahman et al. | |
| 2018/0323927 A1 | 11/2018 | Nagaraja et al. | |
| 2019/0110254 A1 | 4/2019 | Yerramalli et al. | |
| 2019/0182898 A1 | 6/2019 | Yu et al. | |
| 2019/0364561 A1 | 11/2019 | Xiong et al. | |
| 2020/0067615 A1 | 2/2020 | Ghanbarinejad et al. | |
| 2021/0105046 A1* | 4/2021 | Gutman | H04W 72/02 |
| 2021/0152418 A1* | 5/2021 | Abdelghaffar | H04W 72/21 |
| 2021/0168714 A1* | 6/2021 | Guan | H04W 72/044 |

FOREIGN PATENT DOCUMENTS

| | | |
|---|---|---|
| CN | 105594138 A | 5/2016 |
| CN | 107395217 A | 11/2017 |
| CN | 109923820 A | 6/2019 |
| CN | 110495239 A | 11/2019 |
| CN | 110504984 A | 11/2019 |
| WO | 1996039749 A1 | 12/1996 |
| WO | 2018084797 A1 | 5/2018 |
| WO | 2018191055 A1 | 10/2018 |
| WO | 2018232294 A1 | 12/2018 |

OTHER PUBLICATIONS

Tang et al.; "A Temporal Decomposition Quantization Algorithm of Finite Error Line Spectral Frequency Parameters"; Signal Processing, Dec. 31, 2009.

Search Report from Chinese Patent Application No. 202110181297.6 dated Sep. 21, 2023; 14 pgs.

Third Office Action from Chinese Patent Application No. 202110181297.6, dated.

Office Action for Chinese Patent Application No. 202211111950.2 dated Nov. 11, 2024; 7 pgs.

* cited by examiner

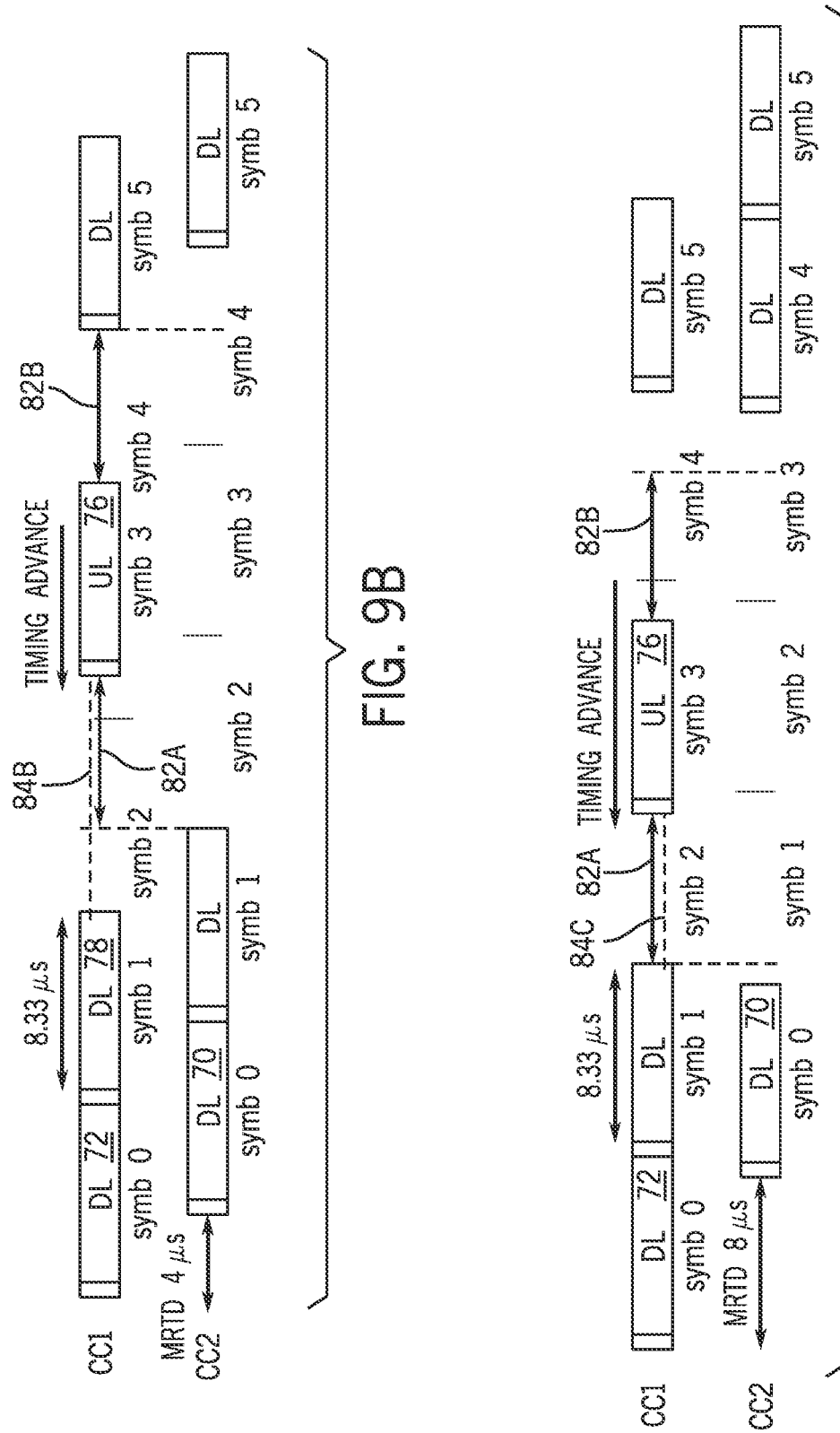

TRANSMISSION DELAY COMPENSATION FOR INTRA-FREQUENCY BAND COMMUNICATION

CROSS-REFERENCE TO RELATED APPLICATIONS

This application is a continuation of and claims priority to U.S. patent application Ser. No. 17/846,943, "TRANSMISSION DELAY COMPENSATION FOR INTRA-FREQUENCY BAND COMMUNICATION," filed Jun. 22, 2022, which is a continuation of and claims priority to U.S. patent application Ser. No. 16/917,359, "TRANSMISSION DELAY COMPENSATION FOR INTRA-FREQUENCY BAND COMMUNICATION," filed Jun. 30, 2020, now U.S. Pat. No. 11,395,296, which claims the benefit of U.S. Provisional Application No. 62/975,445, "OPTIMIZATION OF MAXIMUM ROUND-TRIP DELAY IN HIGH FREQUENCY NR INTER-BAND CARRIER AGGREGATION COMBINATIONS," filed Feb. 12, 2020, each of which are herein incorporated by reference in its entirety for all purposes.

BACKGROUND

The present disclosure relates generally to electronic devices, and more particularly, to electronic devices that utilize radio frequency signals, transmitters, and receivers for wireless communication.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art. Wireless communication systems are rapidly growing in usage. In recent years, wireless devices such as smartphones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Transmitters and/or receivers may be included in various electronic devices to enable communication between user equipment (e.g., user electronic devices, transmitting or receiving electronic devices) and core networks on said wireless networks, deployed through a variety of technologies including but not limited to access network base stations, such as an eNodeB (eNB) for long-term evolution (LTE) access networks and/or a next generation NodeB (gNB) for $5^{th}$ generation (5G) access networks. In some electronic devices, a transmitter and a receiver are combined to form a transceiver. Transceivers may transmit and/or receive wireless signals by way of an antenna coupled to the transceiver, such as radio frequency (RF) signals indicative of data.

With the introduction of inter-band carrier aggregation for frequency range 2 (FR2), which includes frequency bands from 24.25 Gigahertz (GHz) to 52.6 GHz, in the release (Rel-16) of the New Radio standard release relating to 5G communications, a network deployment with distributed cells in the inter-band carrier aggregation (CA) combination may lead to large signal delay differences among aggregated carriers, as perceived by user equipment. Furthermore, hardware design constraints preclude full duplex operations of FR2 user equipment, and delays for a transition receive mode to transmit mode (RX/TX) and/or from transmit mode to receive mode (e.g., TX/RX) may be defined in a design specification concerning 5G communications and/or LTE communications. Indeed, variable signal delay differences between aggregated carriers and the RX/TX and TX/RX switching delays may cause the network to not desirably allocate uplink resources and downlink resources to the user equipment.

Indeed, when a wireless network is provided through one or more network access nodes (e.g., access network base stations, base stations) physically separated from each other, a combination of the base stations communicating with an electronic device may change as the electronic device is physically moved but still registered to the access network (e.g., wireless network). Any suitable technology may implement the techniques described herein with reference to base stations (e.g., network access nodes). In these cases, one or more transceivers of the electronic device may be used to receive communications from one or more base stations and/or from one or more component carriers. When transmitting circuitry is shared between base stations and/or component carriers, simultaneous transmissions, such as simultaneous uplink and downlink communications on a first component carrier and on a second component carrier, may not occur. To enable non-simultaneous uplink and downlink communications, processing circuitry of the base station and/or of the electronic device may use symbols and timing of respective symbols to assign uplink and downlink communication periods. In this way, the base station and/or the electronic device may operate according to a first communication configuration that defines when and how frequently downlink operations are to occur, when and how frequently uplink operations are to occur, how frequently operations are to pause in general to permit another uplink operation to occur, or the like.

When operating to avoid simultaneous transmissions, an electronic device may transmit a control signal to a first base station and to a second base station to indicate an incoming uplink operation to the first base station. In response to receiving the control signal, the first base station may prepare to receive the uplink communication and the second base station may delay ongoing downlink communications. However, delaying the downlink communications as performed by the second base station ultimately slows the downlink communications and may be inefficient.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To accommodate communications from multiple base stations (e.g., multiple access nodes) and/or on multiple component carriers, an electronic device (e.g., user equipment) may include a transceiver that may communicate with the multiple base stations and/or the multiple component carriers. When operating to avoid simultaneous transmissions, the electronic device may transmit a control signal to a first base station and to a second base station to indicate an incoming uplink operation to the first base station. In response to receiving the control signal, the first base station may prepare to receive the uplink communication and the second base station may delay ongoing downlink communications. Delaying downlink communications may permit uplink communication between the first base station and the electronic device to occur without interference from downlink communications from the second base station. When the second base station interrupts the downlink communication, symbols of the downlink communications may be dropped.

However, as will be appreciated and disclosed herein, these operations may be improved by scheduling uplink communications (e.g., scheduling uplink allocations) based on delays associated with an electronic device receiving communications from different component carriers, such as component carriers associated with different base stations. For example, the electronic device and/or a first base station may determine a difference in time between when the electronic device receives a message from the first base station and when the electronic device receives a message from the second base station. The first base station may proceed to delay an uplink operation requested by the electronic device by the difference in time to compensate for the delay between the two base stations. When operating in this way, fewer symbols of the downlink communication of the second base station may be dropped, thereby permitting a more efficient operation of the wireless network.

Various embodiments may be used to deploy the disclosed systems. For example, the second base station may delay the uplink operation by a same (e.g., fixed) delay amount each time as the difference in time. Furthermore, when more than two base stations are communicating with the electronic device, the electronic device may determine the longest delay between each communication, and transmit the longest delay to the first base station as the difference in time. In some cases, the electronic device may report the difference in time as part of a report transmitted to the base station, such as part of a user equipment assistance information report. Furthermore, in some cases, one or more of the base stations may determine the delay between communications. For example, a first base station may determine the delay amount based on signals or messages received from one or more other base stations and/or based on a message from the electronic device using timing for one or more of the other base stations. Base stations may also consider frequency of communications (e.g., numerologies used to deploy each base station) when delaying communications. Furthermore, in some cases, the base stations may operate to delay communications based on an indication that the electronic device is able to perform simultaneous communication.

In some embodiments, user equipment may include a transmitter and a receiver. The user equipment may include a processor communicatively coupled to the transmitter and the receiver. Additionally, the user equipment may include memory that includes instructions that, when executed by the processor, cause the processor to perform operations. The operations performed by the processor may include operating the receiver to receive a first packet at a first time and a second packet at a second time, and may include determining a first difference between the first time and the second time. The operations performed by the processor may include operating the transmitter to transmit an indication of the first difference via a first component carrier to a first base station. The processor may also, when performing the operations, operate the receiver to receive a communication configuration from the first base station via the first component carrier, where the communication configuration may be generated by the first base station based on the first difference between the first time and the second time. The operations performed by the processor may include applying the communication configuration to adjust operation of the receiver, the transmitter, or both according to parameters specified in the communication configuration, and operating the receiver to receive a third packet via the first component carrier according to the communication configuration.

Furthermore, in some embodiments, a method performed according to the discussions herein may involve receiving, by a processor of an electronic device, a first packet via a first component carrier at a first time according to a first communication configuration. The method may also involve receiving, by the processor, a second packet via a second component carrier at a second time according to a second communication configuration. In some cases, the method may involve the processor determining a receive delay at least in part by determining a difference between the first time and the second time, and transmitting, by the processor, a first indication of the receive delay via the first component carrier. The method may include receiving, by the processor, a third communication configuration via the first component carrier generated based on the receive delay and applying the third communication configuration to replace the first communication configuration corresponding to the first component carrier. In some cases, the method includes receiving, by the processor, a third packet via the first component carrier according to the third communication configuration.

Moreover, in some cases, a method performed according to the discussions herein may involve transmitting, by a processor of a base station, a first message on a first component carrier according to a first communication configuration and receiving, by the processor, a receive delay from an electronic device. The receive delay may be determined by the electronic device based at least in part on a time difference between a first time of reception of the first message and a second time of reception of a second message. The electronic device may transmit the receive delay on the first component carrier to the base station. The method may include the processor generating a second communication configuration based at least in part on the receive delay and transmitting the second communication configuration to the electronic device on the first component carrier. The method may also include applying, by the processor, the second communication configuration to replace the first communication configuration corresponding to the first component carrier and transmitting a third message to the electronic device on the first component carrier according to the second communication configuration.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 9B is a timing diagram of fifth example communication schedules for the first and second base stations of FIG. 7, in accordance with an embodiment of the present disclosure;

FIG. 9C is a timing diagram of sixth example communication schedules for the first and second base stations of FIG. 7, in accordance with an embodiment of the present disclosure;

DETAILED DESCRIPTION

Figure 1:
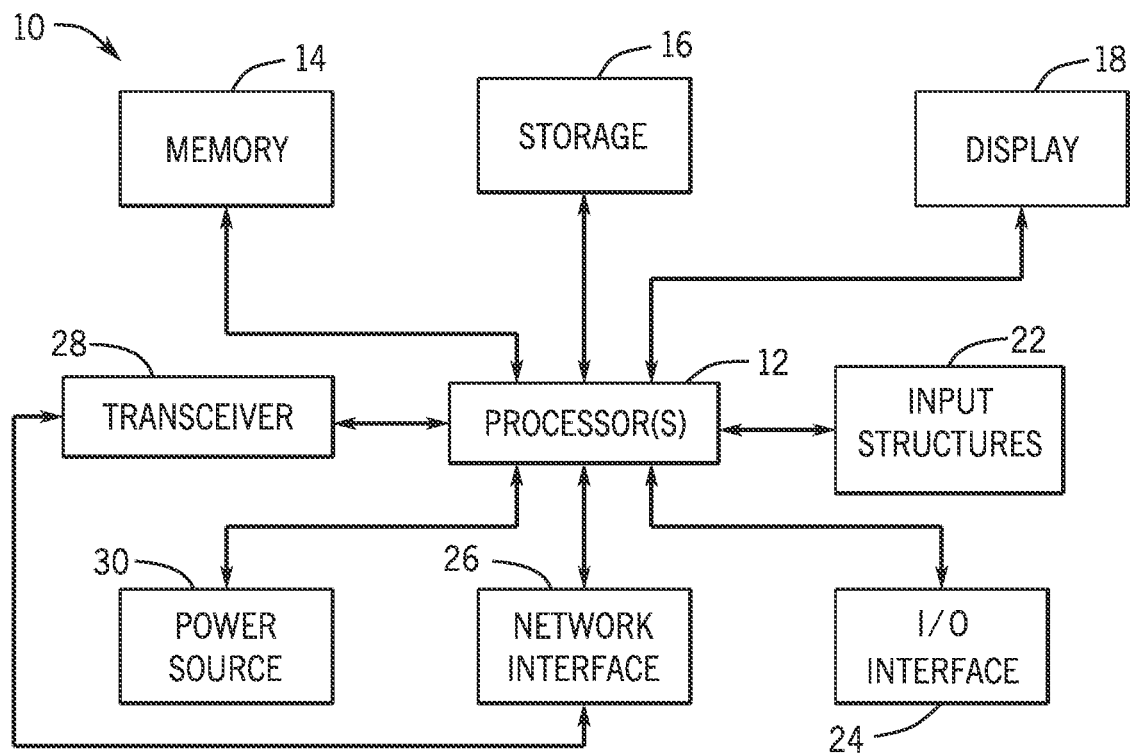
FIG. 1 is a schematic block diagram of an electronic device including a transceiver, in accordance with an embodiment of the present disclosure.

One or more specific embodiments of the present disclosure will be described below. These described embodiments are examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Various processes are disclosed that may adjust an operating frequency range of an antenna. The processes may apply to a variety of electronic devices. In some embodiments, a control system (e.g., a controller, one or more processors) of an electronic device may couple or uncouple a power amplifier to or from an antenna, a transmission path (e.g., a transmission channel) associated with the antenna, and/or a receive path (e.g., a receive channel) associated with the antenna, to change whether the antenna is able to transmit or receive signals. It is noted that a channel may be a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions). For example, long-term evolution (LTE) networks may support scalable channel bandwidths from 1.4 Megahertz (MHz) to 20 MHz. In contrast, wireless local area network (WLAN) channels may be 22 MHz wide while BLUETOOTH® channels may be 1 Mhz wide. Other protocols and standards may include different definitions of channels. Furthermore, some standards may define and use multiple types of channels, such as different channels for uplink or downlink and/or different channels for different uses such as data, control information, or the like. Also, as used herein, the term "band" has the full breadth of its ordinary meaning, and at least includes a section of spectrum (e.g., radio frequency spectrum) in which channels are used or set aside for the same purpose.

Furthermore, in additional or alternative embodiments, the processors may couple or uncouple inductor circuits to change an operating frequency range of the antenna. These processes bring certain advantages to operation, as is described herein. With the foregoing in mind, a general description of suitable electronic devices that may include such processing circuitry is provided below.

Turning first to FIG. 1, an electronic device 10 according to an embodiment of the present disclosure may include, among other things, one or more of processor(s) 12, memory 14, nonvolatile storage 16, a display 18, input structures 22, an input/output (I/O) interface 24, a network interface 26, a transceiver 28, and a power source 30. The various functional blocks shown in FIG. 1 may include hardware elements (including circuitry), software elements (including computer code stored on a computer-readable medium) or a combination of both hardware and software elements. Furthermore, a combination of elements may be included in tangible, non-transitory, and machine-readable medium that include machine-readable instructions. The instructions may be executed by the processor 12 and may cause the processor 12 to perform operations as described herein. It should be noted that FIG. 1 is merely one example of a particular embodiment and is intended to illustrate the types of elements that may be present in the electronic device 10.

Figure 2:
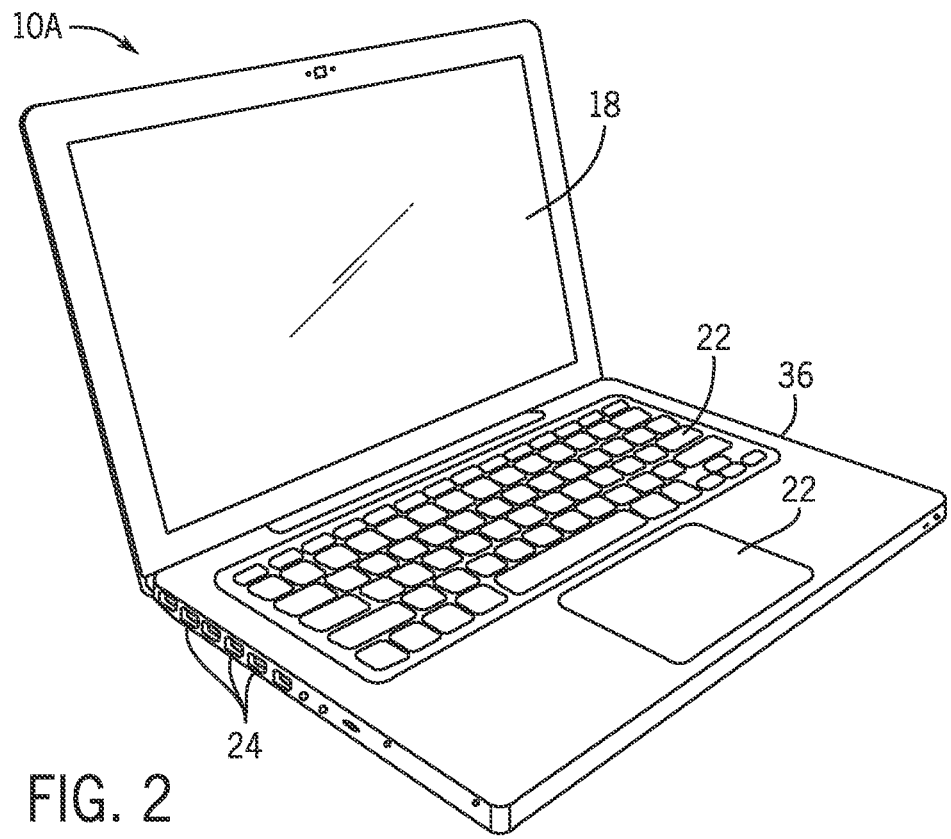
FIG. 2 is a perspective view of a notebook computer representing a first embodiment of the electronic device of FIG. 1.
Figure 4:
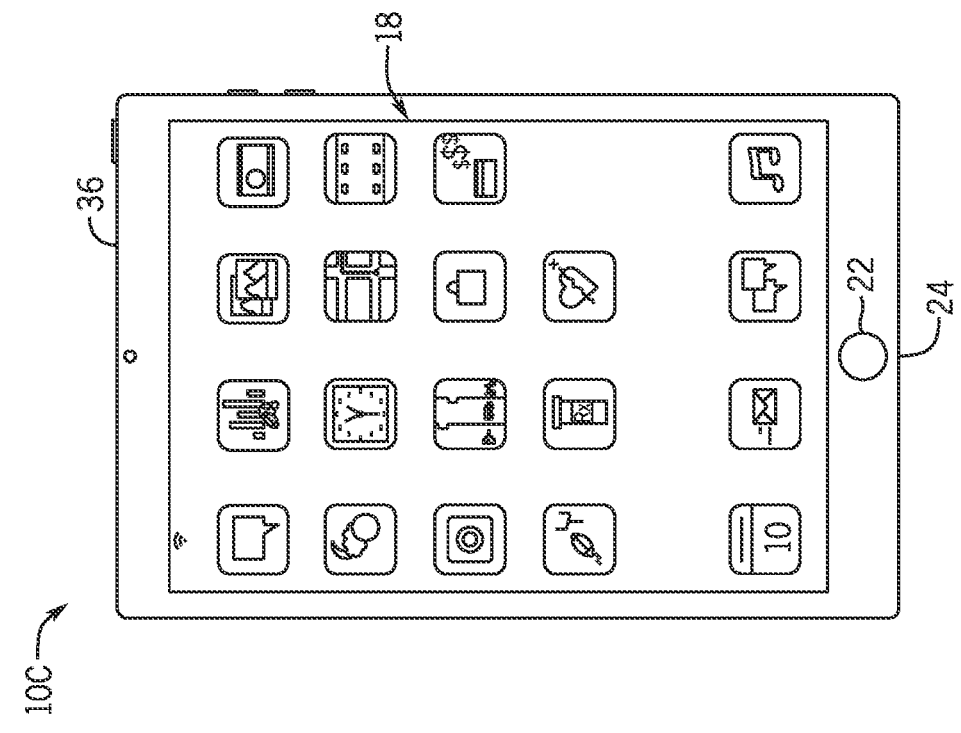
FIG. 4 is a front view of another handheld device representing a third embodiment of the electronic device of FIG. 1.
Figure 3:
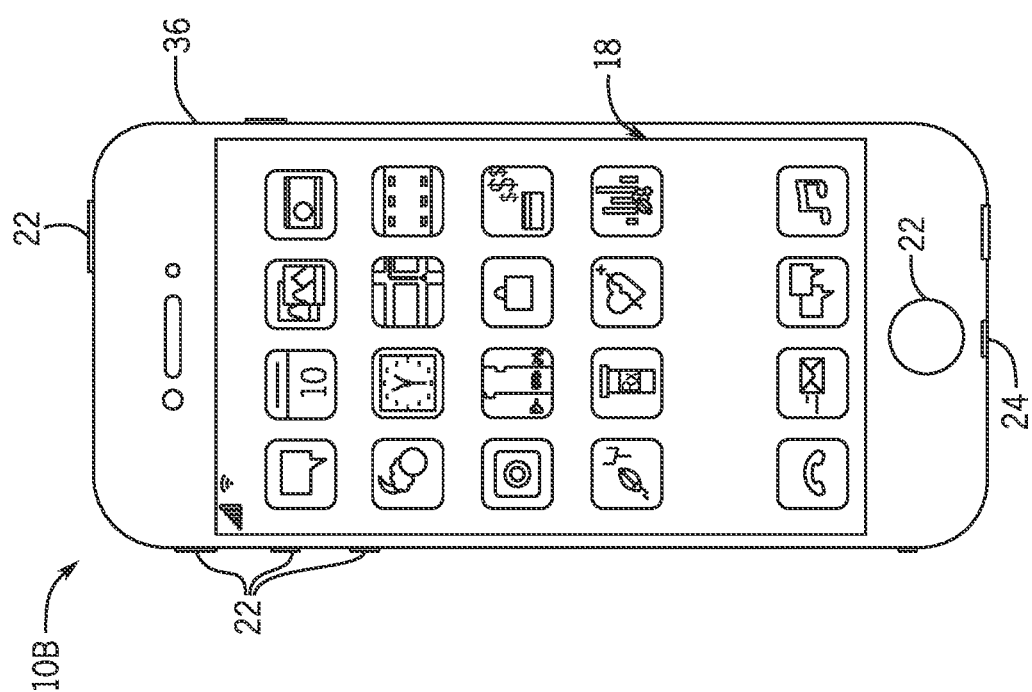
FIG. 3 is a front view of a handheld device representing a second embodiment of the electronic device of FIG. 1.
Figure 5:
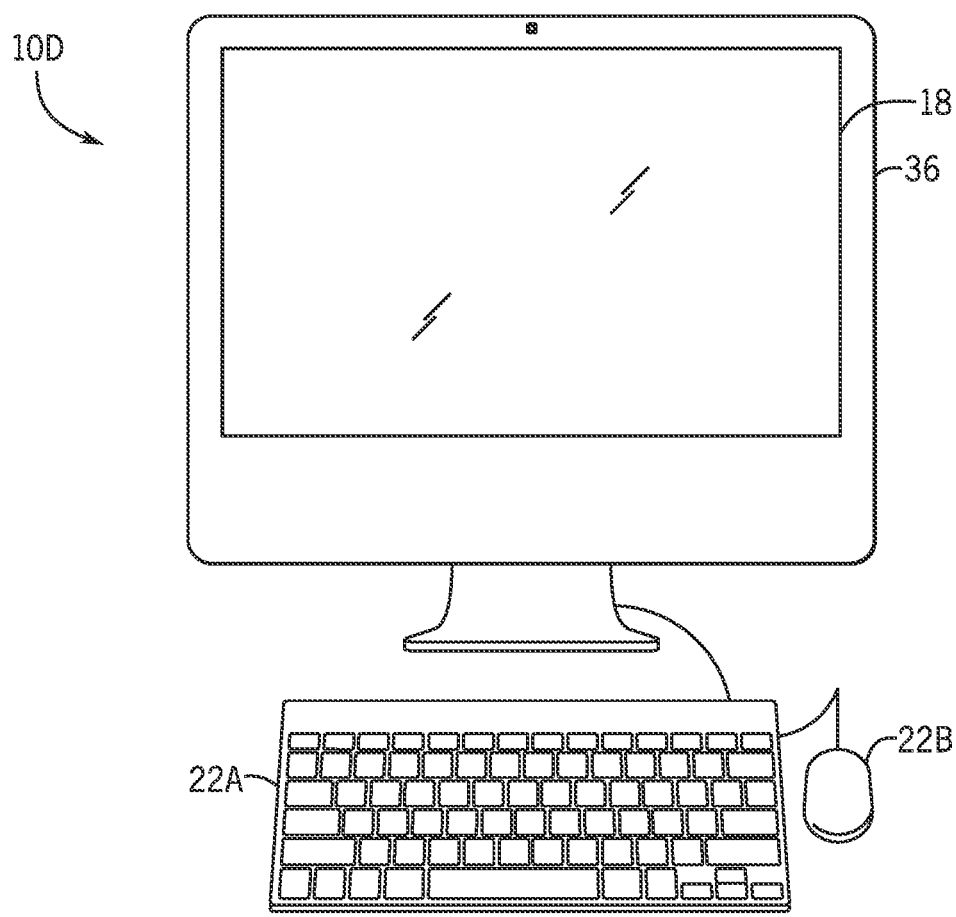
FIG. 5 is a front view of a desktop computer representing a fourth embodiment of the electronic device of FIG. 1.
Figure 6:
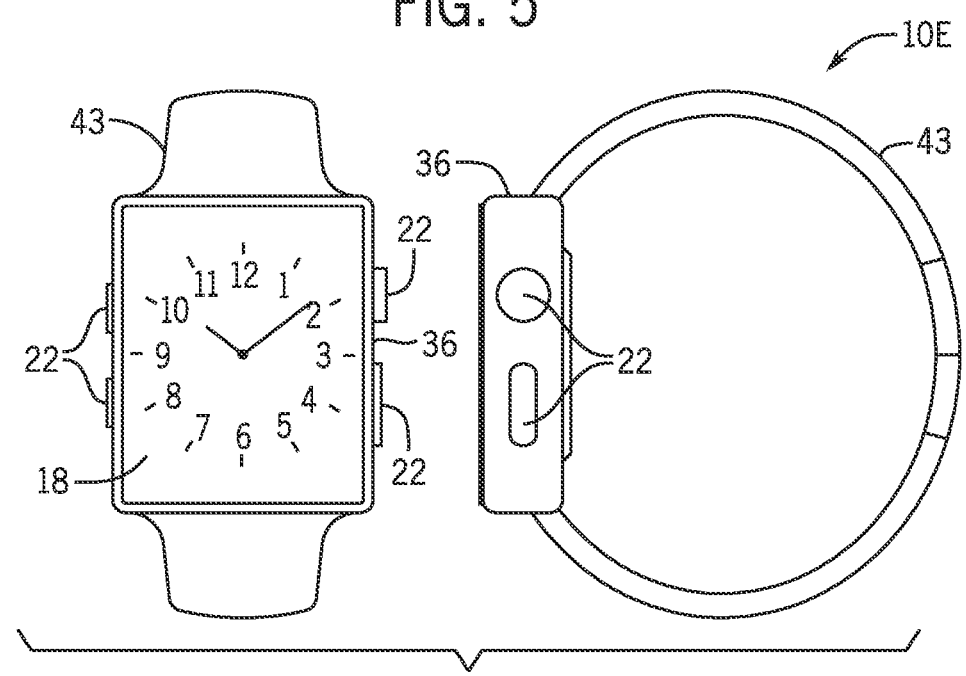
FIG. 6 is a front view and side view of a wearable electronic device representing a fifth embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor 12 may operably couple with the memory 14 and the nonvolatile storage 16 to perform various algorithms. Such programs or instructions executed by the processor 12 may be stored in any suitable article of manufacture that includes one or more tangible, computer-readable media at least collectively storing the instructions or processes, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions executable by the processor 12 to enable the electronic device 10 to provide various functionalities.

In certain embodiments, the display 18 may be a liquid crystal display (LCD) or a digital micromirror display (DMD), which may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more organic light emitting diode (OLED) displays, or some combination of LCD panels and OLED panels.

In some cases, the one or more processors 12 may operate circuitry to input or output data generated by the electronic device 10. For example, the one or more processors 12 may control and/or operate the memory 14, the nonvolatile storage 16, display 18, input structures 22, an input/output (I/O interface) 24, a network interface 26, a transceiver 28, a power source 29, or the like to perform operations of the electronic device 10 and/or to facilitate control of the operations of the electronic device. In particular, the one or more processors 12 may generate control signals for operating the transceiver 28 to transmit data on one or more communication networks.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. The network interface 26 may include, for example, one or more interfaces for a personal area network (PAN), such as a BLUETOOTH® network, for a local area network (LAN) or wireless local area network (WLAN), such as an 802.11x WI-FI® network, and/or for a wide area network (WAN), such as a $3^{rd}$ generation (3G) cellular network, $4^{th}$ generation (4G) cellular network, LTE cellular network, long term evolution license assisted access (LTE-LAA) cellular network, 5$^{th}$ generation (5G) cellular network, or New Radio (NR) cellular network. The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

In some embodiments, the electronic device 10 communicates over the aforementioned wireless networks (e.g., WI-FI®, WIMAX®, mobile WIMAX®, 4G, LTE®, 5G, and so forth) using the transceiver 28. The transceiver 28 may include circuitry useful in both wirelessly receiving and wirelessly transmitting signals (e.g., data signals, wireless data signals, wireless carrier signals, RF signals), such as a transmitter and/or a receiver. Indeed, in some embodiments, the transceiver 28 may include a transmitter and a receiver combined into a single unit, or, in other embodiments, the transceiver 28 may include a transmitter separate from a receiver. The transceiver 28 may transmit and receive RF signals to support voice and/or data communication in wireless applications such as, for example, PAN networks (e.g., BLUETOOTH®), WLAN networks (e.g., 802.11× WI-FI®), WAN networks (e.g., 3G, 4G, 5G, NR, and LTE® and LTE-LAA cellular networks), WIMAX® networks, mobile WIMAX® networks, ADSL and VDSL networks, DVB-T® and DVB-H® networks, UWB networks, and so forth. As further illustrated, the electronic device 10 may include the power source 30. The power source 30 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may be generally portable (such as laptop, notebook, and tablet computers) and/or those that are generally used in one place (such as desktop computers, workstations and/or servers). In certain embodiments, the electronic device 10 in the form of a computer may be a model of a MACBOOK®, MACBOOK® PRO, MACBOOK AIR®, IMAC®, MAC® mini, or MAC PRO® available from Apple Inc. of Cupertino, California. By way of example, the electronic device 10, taking the form of a notebook computer 10A, is illustrated in FIG. 2 in accordance with one embodiment of the present disclosure. The notebook computer 10A may include a housing or the enclosure 36, the display 18, the input structures 22, and ports associated with the I/O interface 24. In one embodiment, the input structures 22 (such as a keyboard and/or touchpad) may enable interaction with the notebook computer 10A, such as starting, controlling, or operating a graphical user interface (GUI) and/or applications running on the notebook computer 10A. For example, a keyboard and/or touchpad may facilitate user interaction with a user interface, GUI, and/or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an IPOD® or IPHONE® available from Apple Inc. of Cupertino, California. The handheld device 10B may include the enclosure 36 to protect interior elements from physical damage and to shield them from electromagnetic interference. The enclosure 36 may surround the display 18. The I/O interface 24 may open through the enclosure 36 and may include, for example, an I/O port for a hard wired connection for charging and/or content manipulation using a connector and protocol, such as the Lightning connector provided by Apple Inc. of Cupertino, California, a universal serial bus (USB), or other similar connector and protocol.

The input structures 22, in combination with the display 18, may enable user control of the handheld device 10B. For example, the input structures 22 may activate or deactivate the handheld device 10B, navigate a user interface to a home screen, present a user-editable application screen, and/or activate a voice-recognition feature of the handheld device 10B. Other of the input structures 22 may provide volume control, or may toggle between vibrate and ring modes. The input structures 22 may also include a microphone to obtain a user's voice for various voice-related features, and a speaker to enable audio playback. The input structures 22 may also include a headphone input to enable input from external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an IPAD® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, and/or may be a standalone media player or video gaming machine. By way of example, the computer 10D may be an IMAC®, a MACBOOK®, or other similar device by Apple Inc. of Cupertino, California. It should be noted that the computer 10D may also represent a personal computer (PC) by another manufacturer. The enclosure 36 may protect and enclose internal elements of the computer 10D, such as the display 18. In certain embodiments, a user of the computer 10D may interact with the computer 10D using various peripheral input devices, such as keyboard 22A or mouse 22B (e.g., input structures 22), which may operatively couple to the computer 10D.

Similarly, FIG. 6 depicts a wearable electronic device 10E representing another embodiment of the electronic device 10 of FIG. 1. By way of example, the wearable electronic device 10E, which may include a wristband 43, may be an APPLE WATCH® by Apple Inc. of Cupertino, California. However, in other embodiments, the wearable electronic device 10E may include any wearable electronic device such as, a wearable exercise monitoring device (e.g., pedometer, accelerometer, heart rate monitor), or other device by another manufacturer. The display 18 of the wearable electronic device 10E may include a touch screen version of the display 18 (e.g., LCD, OLED display, active-matrix organic light emitting diode (AMOLED) display, and so forth), as well as the input structures 22, which may facilitate user interaction with a user interface of the wearable electronic device 10E. In certain embodiments, as previously noted above, each embodiment (e.g., notebook computer 10A, handheld device 10B, handheld device 10C, computer 10D, and wearable electronic device 10E) of the electronic device 10 may include the transceiver 28.

Figure 7:
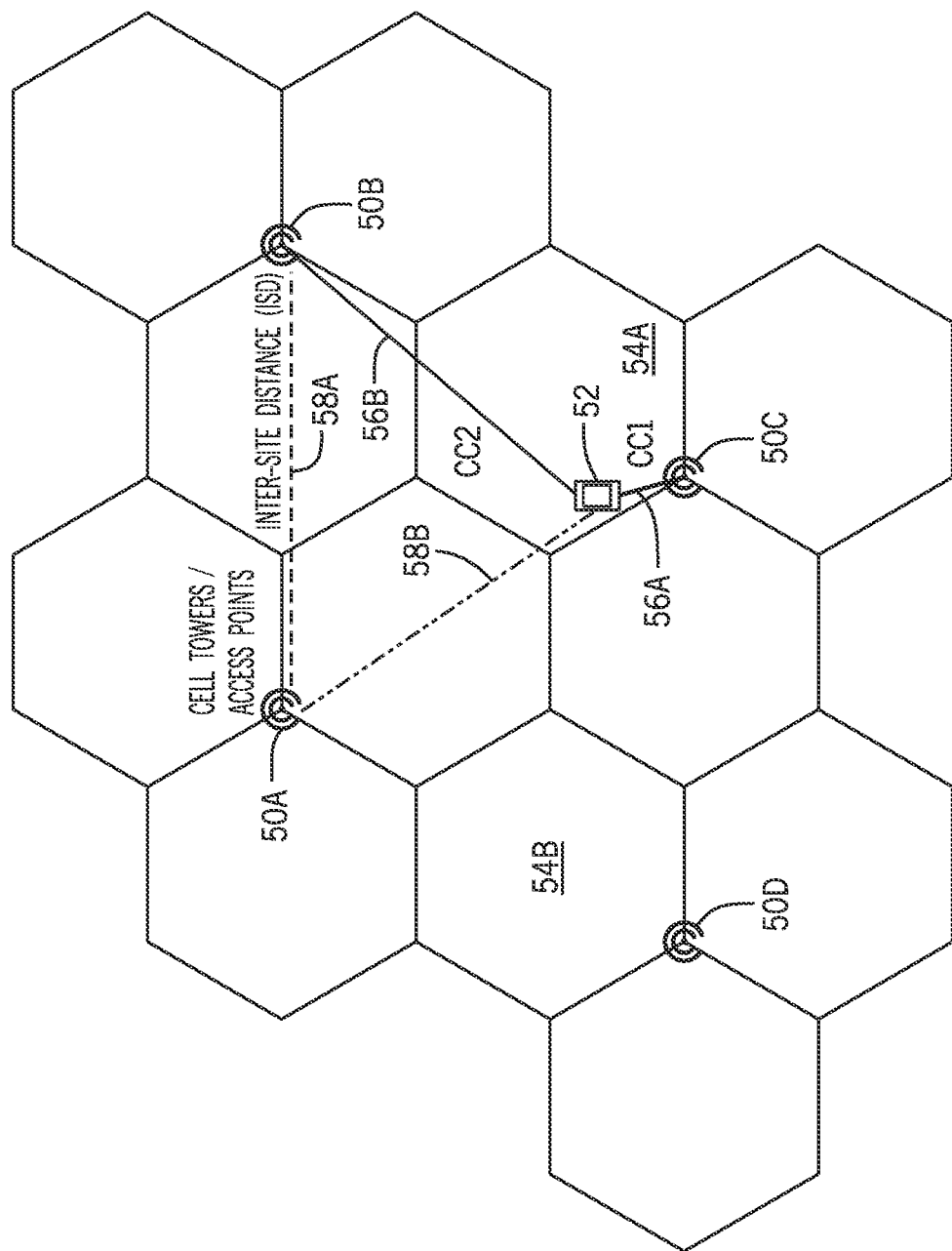
FIG. 7 is an illustration of base stations communicating with an electronic device, such as the electronic device of FIG. 1, in accordance with an embodiment of the present disclosure.

Keeping the foregoing in mind, FIG. 7 is an illustration of access network nodes, such as base stations 50 (e.g., base station 50A, base station 50B, base station 50C, base station and user equipment, such as an electronic device 52, according to embodiments of the present disclosure. Each of the base stations 50 and/or the electronic device 52 may have one or more components similar to the electronic device 10, and thus may include control circuitry, such as the processors 12, memory circuitry, such as the memory 14 and/or nonvolatile storage 16, which may operate together to cause the base stations 50 and/or the electronic device 52 to perform operations. It is noted that user equipment able to communicate with the access nodes may include any of various types of computer systems device which are mobile or portable and which performs wireless communications. Examples of user equipment any suitable portable electronic devices, mobile telephones, smart phones, portable gaming devices, laptops, wearable devices, or the like. In general, the term "UE" or "UE device" can be broadly defined to encompass any electronic, computing, and/or telecommunications device (or combination of devices) which is easily transported by a user and capable of wireless communication.

Each of the base stations 50 may be associated with one or more cells 54. The term "base station" has the full breadth of its ordinary meaning, and at least includes a wireless communication station installed at a fixed location and used to communicate as part of a wireless telephone system or radio system. The base stations 50 and the electronic device 52 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), or the like. Note that if a respective base station of the base stations 50 is implemented in the context of LTE, it may alternately be referred to as an "eNodeB" or "eNB". Note that if a respective base station of the base stations is implemented in the context of 5G NR, it may alternately be referred to as "gNodeB" or "gNB".

Thus, while base stations 50 may act as a "serving cell" for electronic devices as illustrated in FIG. 7, an electronic device 52 may also be capable of receiving signals from (and possibly within communication range of) one or more other cells (which might be provided by base stations 50 and/or any other base stations), which may be referred to as "neighboring cells." Such cells may also be capable of facilitating communication between user devices and/or between user devices and the network. Such cells may include "macro" cells, "micro" cells, "pico" cells, and/or cells which provide any of various other granularities of service area size.

Each of the cells 54 may be an operating region that a respective base station 50 is able to communicate over. For example, a respective base station 50 may communicate with electronic devices 52 disposed in each cell 54 depicted as touching the respective base station 50. In this way, while within borders of cell 54A, the electronic device 52 may communicate with the base station 50C as opposed to the base station 50D, which may communicate with the electronic device 52 while within the borders of cell 54B.

When communicating with an electronic device 52, a respective base station 50 may transmit messages on a frequency range referred to as a component carrier. A frequency band, which may include one or more of the frequency ranges and be delimited by a lower frequency and a higher frequency (e.g., representative of a radio spectrum), may include one or more component carriers. The frequency ranges encompassed by the frequency band may be defined by a standards body (e.g., standards generated by the Third Generation Partnership Project (3GPP) standards body or development group), and thus may include a $3^{rd}$ generation (3G), $4^{th}$ generation (4G), $5^{th}$ generation (5G) frequency band. For example, the frequency band may include frequencies between 24 Gigahertz (GHz) and 48 GHz. In particular, messages within a same frequency band on separate component carriers of different frequency ranges may be transmitted (e.g., concurrently) without cross-interference. In some instances, the electronic device 52 may couple to one or more base stations 50 through two or more component carriers. For example, the electronic device 52 may use a component carrier 56A to communicate with the base station 50C, and use a component carrier 56B to communicate with the base station 50B. The component carriers 56A, 56B may both be within a same frequency band, such as a New Radio (NR) or $5^{th}$ generation (5G) frequency band, but be associated with different frequency ranges within the same frequency band.

Hardware, software, or communication standards associated with operational control of the electronic device 52 may limit concurrent (e.g., simultaneous) uplink and downlink communications between component carriers 56. In particular, while the electronic device 52 may receive many downlink communications separately or concurrently, the electronic device 52 may not receive any downlink communications or send any additional uplink communications while transmitting an uplink communication to one of the base stations 50. To reduce a likelihood of concurrent communications occurring when uplinking a message to the base station, the electronic device 52 may request an uplink allocation from one of the base stations 50 before proceeding to uplink a message to the base station. For example, the electronic device 52 may receive simultaneous downlink messages from the base stations 50 and/or may request an uplink allocation from both base stations 50 before uplinking a message to one of the base stations 50, such as base station 50C. This operation, however, does not consider timing delays seen by the electronic device 52 when communicating with the base stations 50. When the electronic device 52 requests an uplink allocation from the base stations 50 without consideration for the timing delays between the communications, unnecessary delays may occur when downlink operations resume, causing inefficient operation.

To elaborate, base stations 50 may be physically disposed a distance 58A (e.g., logical distance, physical distance, temporal distance) from each other. For example, according to 3GPP standard number TR38.803, a maximum inter-site distance (ISD) for FR2 is 300 meters (m), which may correspond to a 1 microsecond (μs) propagation delay seen by the electronic device 52 when receiving communications sent substantially simultaneous from different base stations 50. Some FR2 network deployments may use a larger ISD, such as up to 1500 m, which may correspond to a 5 μs propagation delay. According to 3GPP standard number T538.104, a maximum timing error permitted between gNBs is 3 μs. This corresponds to a maximum receive timing delay difference (MRTD) between distributed carriers (e.g., inter-frequency carriers) at the electronic device 52 of between 4 μs to 8 μs.

Keeping this in mind, the electronic device 52 may be a distance 58B from each respective base station of the base stations 50. As a distance between the electronic device 52 and the base station increases, so does the delay of communication between the devices. In this way, a delay of communication between the base station 50B and the electronic device 52 is greater than a delay of communication between the base station 50A and the electronic device 52, due to the greater distance between the base station 50B and the electronic device 52. To improve the process of requesting an uplink allocation, the electronic device 52 may consider the delay of communication when requesting the uplink allocation, and/or the base station may consider the delay of communication when proceeding to schedule the uplink allocation in response to the request for the uplink allocation from the electronic device 52. For example, in some cases, one or more of the base stations 50 may adjust communication scheduling based on a predetermined adjustment and/or a defined adjustment (e.g., a value stored in a memory or storage).

Figure 8A:
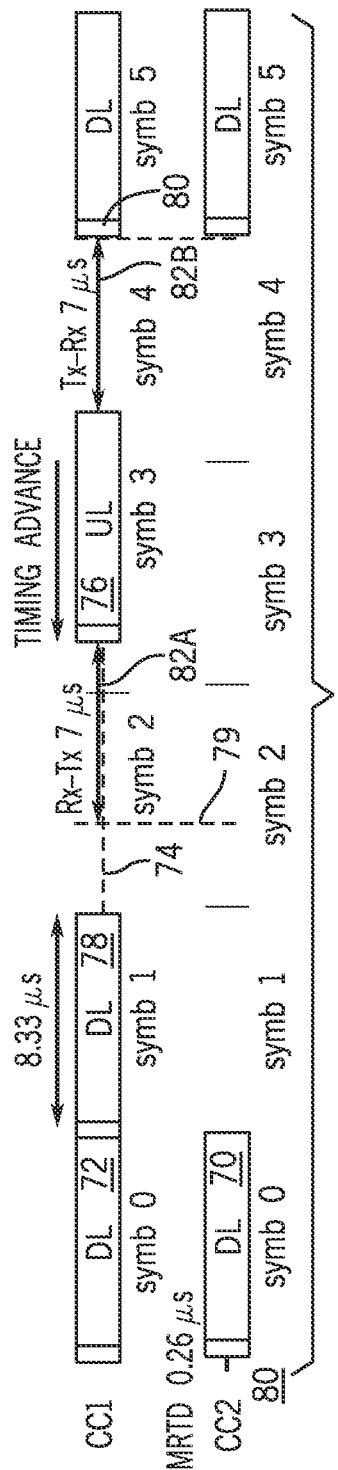
FIG. 8A is a timing diagram of first example communication schedules for first and second base stations of FIG. 7, in accordance with an embodiment of the present disclosure.
Figure 8B:
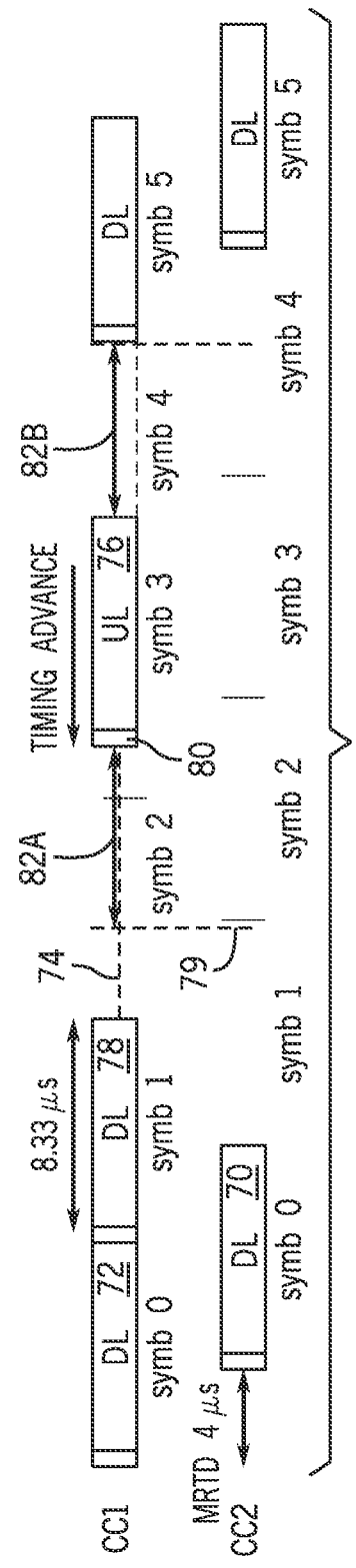
FIG. 8B is a timing diagram of second example communication schedules for the first and second base stations of FIG. 7, in accordance with an embodiment of the present disclosure.
Figure 8C:
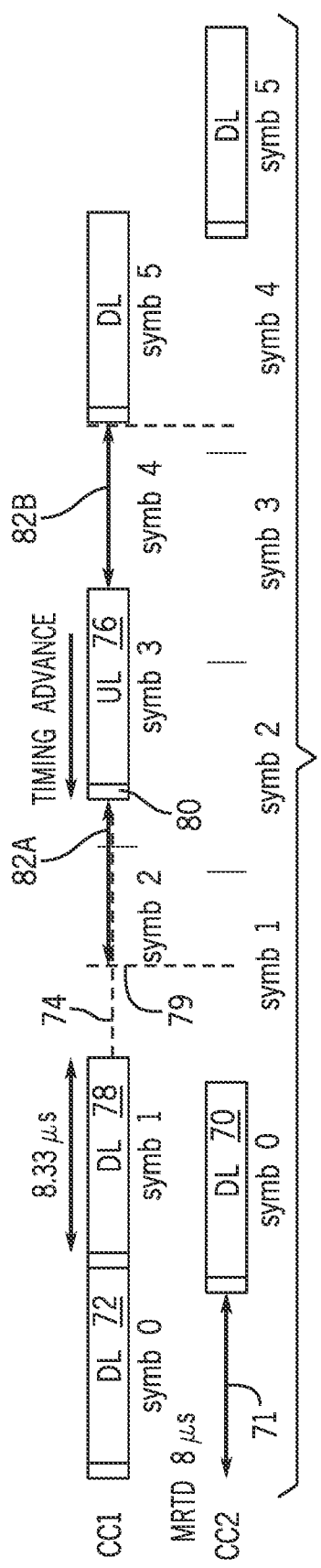
FIG. 8C is a timing diagram of third example communication schedules for the first and second base stations of FIG. 7, in accordance with an embodiment of the present disclosure.

FIG. 8A, FIG. 8B, and FIG. 8C show examples of a base station, for example the base station 50C, adjusting its communication scheduling based on a predetermined adjustment, regardless of an amount of delay between communications of the base station and another base station, such as base station 50B. For ease of explanation, FIG. 8A, FIG. 8B, and FIG. 8C are discussed together.

FIG. 8A is a timing diagram of a communication schedule for the component carrier 56A (e.g., CC1) corresponding to the base station 50C and of a communication schedule for the component carrier 56B (e.g., CC2) corresponding to the base station 50B, according to embodiments of the present disclosure. FIG. 8A shows a first example delay (e.g., maximum receive timing delay (MRTD)) where the electronic device 52 receives a downlink message 70 from the base station 50C 0.26 microseconds (μs) after receiving a downlink message 72 from the base station 50B intended to be simultaneously received during a first symbol duration for the base station 50C (e.g., symb 0). It may be said that the communications from the base station are generally synchronized with the communications from base station 50C since 0.26 μs may be considered less than a threshold amount of time (where the threshold may be used to evaluate whether communication configurations warrant adjustment, such as when unsynchronized). FIG. 8B is a timing diagram of a communication schedule for the component carrier 56A and for the component carrier 56B having a second example delay, where the electronic device 52 receives a downlink message 70 from the base station 50C 4 μs after receiving a downlink message 72 from the base station 50B intended to be simultaneously received during the first symbol duration for the base station 50C, according to embodiments of the present disclosure. FIG. 8C is a timing diagram of a communication schedule for the component carrier 56A and for the component carrier 56B having a third example delay where the electronic device 52 receives a downlink message 70 from the base station 50C approximately 8 μs (e.g., duration of time 71) after receiving a downlink message 72 from the base station 50B intended to be simultaneously received during the first symbol duration for the base station 50C, according to embodiments of the present disclosure. The third example delay of FIG. 8C (e.g., 8 μs) may be greater than the second example delay of FIG. 8B, implying that the distance between the electronic device 52 and the base station 50B associated with FIG. 8C is greater than the distance between the two associated with FIG. 8B. It is noted that FIGS. 8A-8C may be discussed together for ease of explanation.

Communication operations may be scheduled according to symbol durations. The symbols (e.g., symb 0, symb 1, symb 2, . . . , symb 5) may represent allocations of time that are able to be assigned to either downlink communications or uplink communications. When a symbol is assigned to downlink communications, the electronic device 52 may receive simultaneous downlink messages on one or more component carriers 56. However, when a symbol is assigned to uplink communications, the electronic device 52 may not receive simultaneous uplink messages and/or simultaneous downlink messages. Thus, the base station may use an interrupt command, such as at time 79, to pause downlink communications while the base station 50C operates to uplink a message from the electronic device 52. In this way, the base station 50B may generate an interrupt command in response to receiving a notification from the electronic device 52 that indicates the electronic device 52 is requesting an uplink allocation from the base station 50C (e.g., requesting that one or more future symbols be assigned to uplink communications by the base station 50C).

FIGS. 8A-8C show a constant adjustment 74 to the start of an uplink operation (e.g., a delay to a start of uplink message 76 after an end of an ongoing downlink message 78 at a time that an interrupt command is generated by the base station 50) initiated by an uplink allocation request by permitting any ongoing downlink operations to finish based on a maximum delay that may occur. The maximum delay, and thus a value of the constant adjustment 74, equals or is substantially equal to 8 μs after a completion of operations to send downlink message 78, and thus the uplink message 76 is scheduled to occur approximately 8 μs (e.g., between 5 μs and 11 μs) after downlink message 78. It is noted that each uplink message 76 and/or downlink message 72, 78 may be associated with a prefix 80. The prefix 80 may be a cyclic prefix that repeats delivery of a portion of the messages 70, 72, 76, 78 (e.g., adds a portion of the end of the message to the front of the message). A cyclic prefix may combat against intra-symbol interferences or interference from previously received signals at the electronic device 52. The prefix 80 may additionally or alternatively include information (e.g., header information) that identifies a duration of the communication, a source of the communication, or may include other data that the electronic device 52 may use when processing the communication.

The base stations 50 may also use a duration 82 of time (e.g., labeled as duration 82A, duration 82B) to prepare transmission and/or reception circuitry of the electronic device 52 and/or of the base station 50B for uplink operation. For example, a base station 50 may couple one or more power amplifiers to one or more antennas of the respective circuits during the duration 82 of time. When adjusting operation of the base stations 50 to compensate for communication delays seen by the electronic device 52, the base stations 50 may use the durations 82, and thus pause downlink operations early enough as to not be missed or interfered with when adjusting the circuitry.

Since the constant adjustment 74 is substantially similar to the maximum delay used to delay of communication shown in FIG. 8C (e.g., 8 μs), the interruption by the base station 50B of downlink operations is relatively optimal. However, when the constant adjustment is greater than the delay of communication (or less than, although not particularly depicted), the interruption operations are inefficient. For example, interruption by the base station 50B of its downlink operations causes four symbols to be dropped in FIGS. 8A and 8B (e.g., skips symb 1-4). Efficiency of interruption operations may improve when communication scheduling considers the particular delays as opposed to using a globally defined delay value (e.g., a same delay value for each adjustment as opposed to one calculated for a specific arrangement of components at the time of adjustment).

Figure 9A:
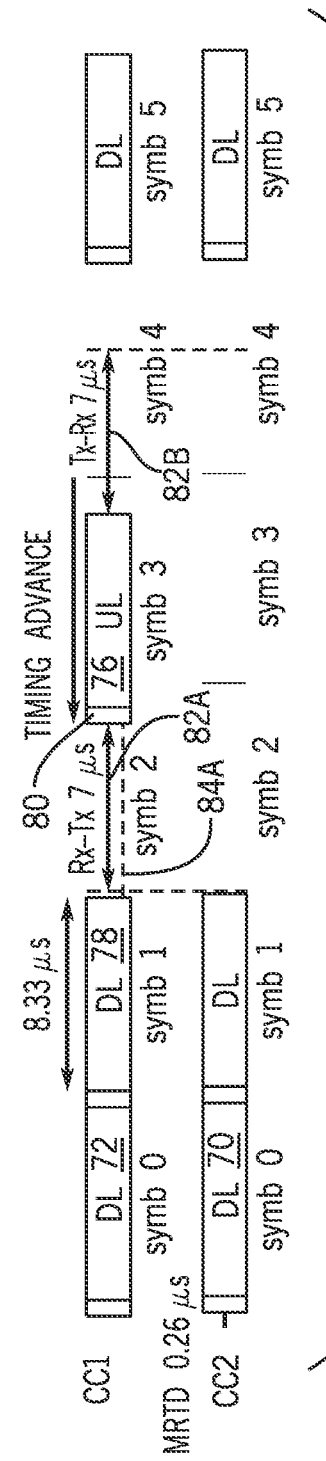
FIG. 9A is a timing diagram of fourth example communication schedules for the first and second base stations of FIG. 7, in accordance with an embodiment of the present disclosure.

To explain variable delay operations, FIG. 9A, FIG. 9B, and FIG. 9C show a variable adjustment 84 (labeled in the figures as adjustment 84A, adjustment 84B, adjustment 84C) to the start of an uplink message 76. FIG. 9A is a timing diagram of a communication schedule for the component carrier 56A (e.g., CC1) corresponding to the base station 50C and of a communication schedule for the component carrier 56B (e.g., CC2) corresponding to the base station 50B. FIG. 9A shows a first example delay where the electronic device 52 receives a downlink message 70 from the base station 50C 0.26 µs after receiving a downlink message 72 from the base station intended to be simultaneously received during a first symbol duration for the base station (e.g., symb 0), according to embodiments of the present disclosure. It may be said that the communications from the base station 50B are generally synchronized with the communications from base station 50C since 0.26 µs may be considered less than a threshold amount of time (where the threshold may be used to evaluate whether communication configurations warrant adjustment, such as when unsynchronized). The threshold amount of time may be any suitable amount of time, such as between 0.8 µs and 1.1 µs (e.g., 1 µs).

FIG. 9B is a timing diagram of a communication schedule for the component carrier 56A and for the component carrier 56B having a second example delay, where the electronic device 52 receives a downlink message 70 from the base station 50C 4 µs after receiving a downlink message 72 from the base station 50B intended to be simultaneously received during the first symbol duration for the base station 50C, according to embodiments of the present disclosure. FIG. 9C is a timing diagram of a communication schedule for the component carrier 56A and for the component carrier 56B having a third example delay where the electronic device 52 receives a downlink message 70 from the base station 50C a maximum delay amount (e.g., 8 µs) after receiving a downlink message 72 from the base station 50B intended to be simultaneously received during the first symbol duration for the base station 50C, according to embodiments of the present disclosure. The third example delay of FIG. 9C may be greater than the second example delay of FIG. 9B, implying that the distance between the electronic device 52 and the base station 50B associated with FIG. 9B is smaller than the distance between the two associated with FIG. 9C.

Adjustment 84A and adjustment 84C are shown as being substantially similar durations of time while adjustment 84B is shown as a longer duration of time. In this way, the base station 50C may have adjusted its communication scheduling to better align with delays of communications associated with the base station 50B, and thus may have used a greater adjustment to delay its uplink allocation to permit for an improved aligned with allocations of the base station 50B. Thus, operations of FIGS. 9A-9C visualize relatively more efficient scheduling operations, since each example drops a reduced number of symbols (e.g., three symbols each).

The downlink allocations and/or the uplink allocation timing advance may be adjusted for each electronic device 52 communicating with the base stations 50 based on the communication delay between the respective base station and the respective electronic device 52. For each possible delay value (e.g., between no delay and a maximum delay) and when a frequency of communication transmission (e.g., numerology associated with the base station 50) is equal, the period of interruption of downlink communications for the base station 50C (transmitted using a first component carrier 56A (CC1)) may be substantially similar to the period of interruption of downlink communications for the base station 50B (transmitted using a second component carrier 56B (CC2)), and thus include two symbols (e.g., symb 2 and symb 4) more than a total number of symbols allocated for the uplink communication (e.g., symb 3). A scheduler of the wireless network provider communicatively coupled to the base station 50B and the base station 50C may determine a suitable timing advance for the uplink communication, and may adjust downlink allocations and/or uplink allocations to minimize interruptions to communications based on a determined delay between the base stations 50. However, for ease of discussion, the base stations 50 are referred to as determining and applying the adjustments. It is noted that the communications depicted in FIGS. 8A-9C represent a snapshot of communications over time, and thus should be understood as able to extend beyond what is depicted in the figures.

Figure 10:
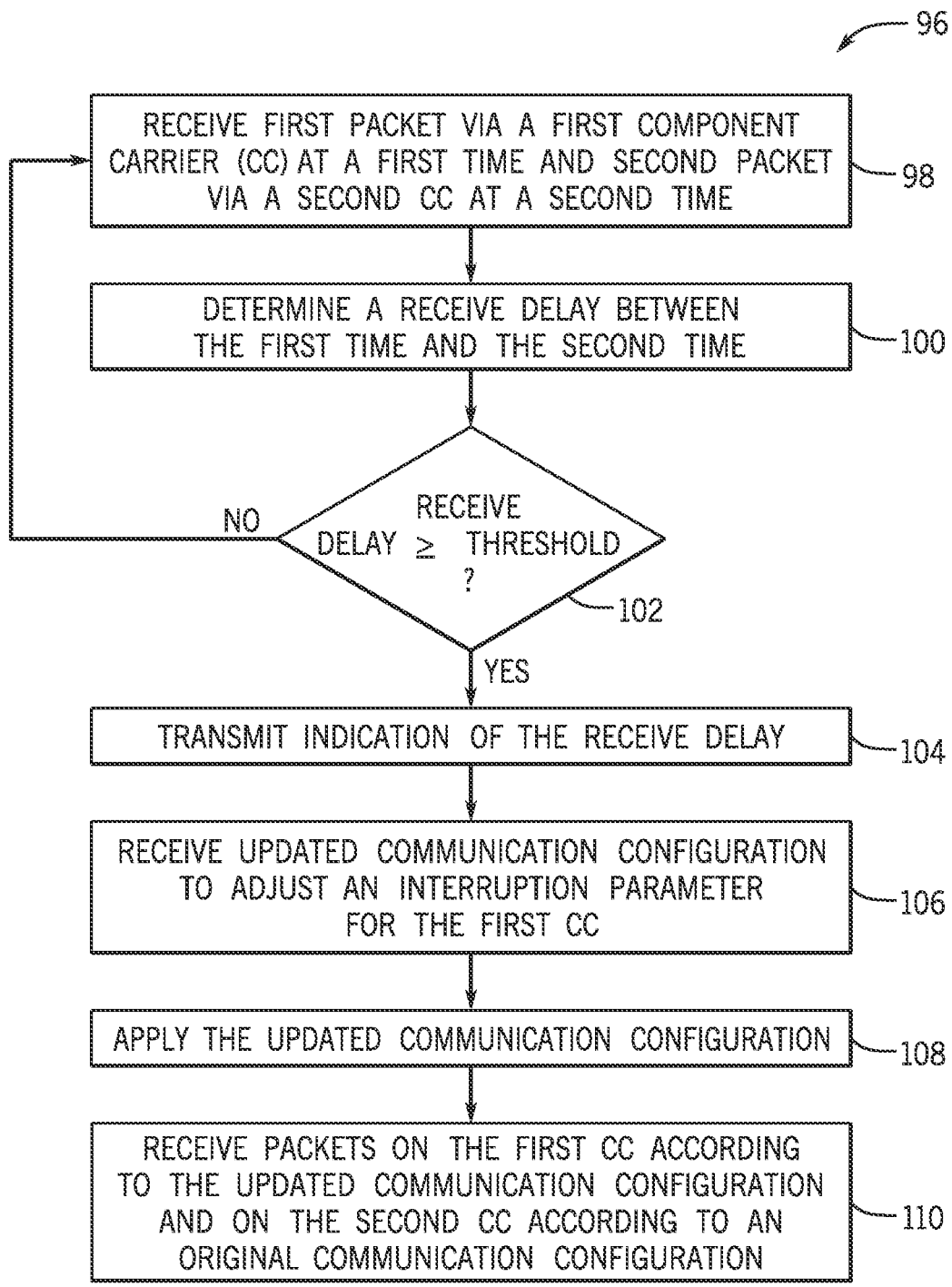
FIG. 10 is a flow chart of a method for operating the electronic device of FIG. 7 to transmit or receive radio frequency (RF) signals using a communication configuration adjusted based on delays seen by the electronic device, in accordance with an embodiment of the present disclosure.

To clarify further on the operation of the electronic device 52 when adjusting operations based on one or more delays (e.g., communication delays), FIG. 10 is a flow chart of a method 96 for operating the electronic device 52 to transmit and/or receive RF signals using a communication configuration adjusted based on delays experienced by the electronic device 52, according to embodiments of the present disclosure. It is noted that, although depicted in a particular order, the blocks of the method 96 may be performed in any suitable order, and at least some blocks may be skipped altogether. As described herein, the method 96 is described as performed by the electronic device 52, however, it should be understood that any suitable processing and/or control circuitry may perform some or all of the operations of the method 96, such as one or more of the processors 12.

At block 98, the electronic device 52 may receive a first packet (e.g., a first message) from a first base station of the base stations 50 via first component carrier at a first time and receive a second packet (e.g., a second message) from a second base station of the base stations 50 on a second component carrier at a second time. The first time and the second time may correspond to a time at which the prefix 80 is received and/or a time at which a first portion of the respective message is received (e.g., downlink message 70, downlink message 72). The first time and the second time may be stored in storage similar to memory 14. These times may be used to determine a delay at that moment, and/or may be additionally or alternatively accessed in the future to determine how the delay changes over time (e.g., a historical analysis of the delay).

At block 100, the electronic device 52 may determine a receive delay between the first time and the second time. To do so, the electronic device 52 may determine a duration of time as the receive delay between the first time and the second time. To determine the receive delay, the electronic device 52 may compute the difference between the two times. However, in some cases, the electronic device 52 may determine the difference in time by using counters to track the receive delay between receiving the downlink message 70 and receiving the downlink message 72. The counter may count a duration of time, such as a number of clock cycles, between the electronic device 52 receiving the downlink message and the downlink message 72.

At block 102, the electronic device 52 may determine whether the receive delay determined at block 100 is greater than or equal to a threshold amount of time. The electronic device 52 may determine whether the receive delay, if any, is of sufficient time delay to be corrected. In some cases, a threshold amount of time may be used to evaluate whether communication configurations warrant adjustment, such as when unsynchronized. The threshold amount of time may vary based on environmental conditions and/or network load conditions, based on what external factors may adjust what amount of non-synchronization is permitted and/or otherwise suitable. In some cases, the threshold amount of time may be substantially similar (e.g., approximately) to 1 μs (e.g., amount between 0.5 μs and 1.5 μs), where any receive delay below that threshold is generally ignored and operations proceed to block 98. However, when the receive delay is greater than or equal to the threshold, the electronic device 52 may proceed to perform operations of block 104.

At block 104, the electronic device 52 may transmit an indication of the receive delay to the first base station, the second base station, or both. For example, referring to the example of FIG. 9B, the electronic device 52 may determine that the receive delay (e.g., maximum receive timing delay (MRTD)) is equal (or substantially similar) to 4 μs. The electronic device 52 may then, in response to determining that the receive delay is greater than the threshold, transmit an indication of the receive delay to the base station 50B and/or the base station 50C. The base station 50B and/or the base station may use the indication of the receive delay to generate an updated communication configuration for the electronic device 52 to apply.

At block 106, the electronic device 52 may receive an updated communication configuration from the first base station to adjust an interruption parameter associated with the first base station. For example, the interruption parameter may operate to delay associated downlink communications scheduled for transmission on a component carrier used by the first base station. When referring to the example of FIG. 9B, the electronic device 52 may receive an updated communication configuration from the base station 50C that defines adjustments to communications scheduled for transmission/reception on the component carrier 56A. The updated communication configuration may indicate to the electronic device 52 that the uplink allocation requested by the electronic device is to be delayed a period of time after the downlink message 78.

At block 108, the electronic device 52 may apply the updated communication configuration to its software and/or hardware (e.g., replace a previous communication configuration stored in software and/or affecting operation of transceiver circuitry) to prepare for the adjusted communication allocations. In this way, the electronic device 52 may instruct its control and/or scheduling circuitry to delay uplink of the uplink message until time that compensates for delays associated with communications between the electronic device 52 and the base station 50B. Furthermore, applying the updated communication configuration to the circuitry of the electronic device 52 may prepare antenna circuitry of the electronic device 52 to perform uplink operations and/or downlink operations.

At block 110, the electronic device 52 may receive packets on the first component carrier 56A according to the updated communication configuration and may receive packets on the second component carrier 56B according to an original communication. In this way, even when communications on the second component carrier 56B are delayed (e.g., due to the base station 50B being disposed further from the electronic device 52 than the base station 50C), communications from the base station 50C on the first component carrier 56A may be suitably delayed based on the receive delay (e.g., delayed by an amount equal or substantially similar to the receive delay) to improve alignment of communications on the two component carriers 56B. When operating to compensate for variable delays between the component carriers 56, the electronic device 52 may reduce an amount of delay in downlink communications when scheduling an uplink communication (e.g., four dropped symbols when operating to compensate for the delay using fixed adjustments as opposed to three dropped symbols when operating to compensate for the delay using variable adjustments). It is noted that although described as adjusting the communication configuration of the first component carrier 56C based on the receive delay instead of the communication configuration of the second component carrier 56B, the same or similar methods may be applied to adjusting either component carriers 56 or both component carriers 56 as opposed to just one component carrier 56 (e.g., component carrier 56B).

Figure 11:
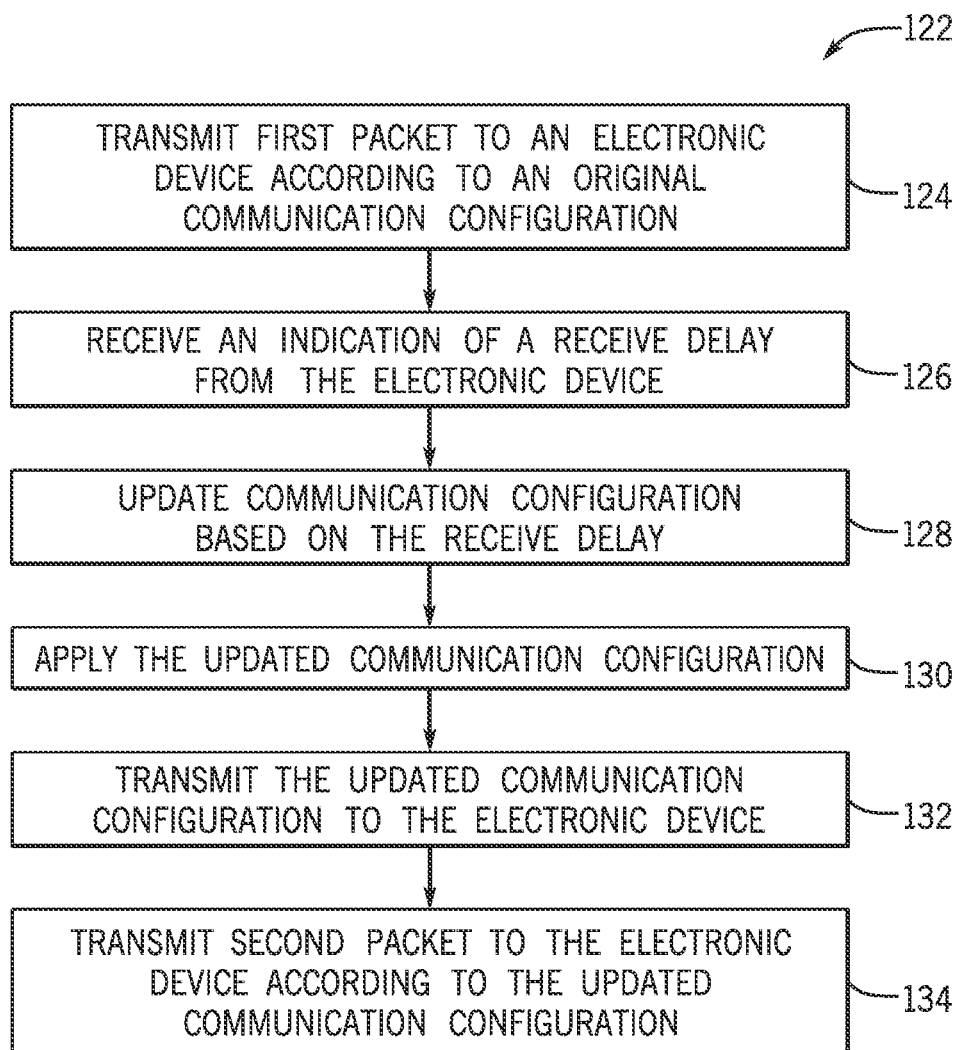
FIG. 11 is a flow chart of a method for operating a base station, such as the base station of FIG. 7, to transmit or receive RF signals using a communication configuration adjusted based on delays seen by the electronic device 52, in accordance with an embodiment of the present disclosure.

FIG. 11 is a flow chart of a method 122 for operating a base station, such as the base station of FIG. 9B, to transmit or receive RF signals using a communication configuration adjusted based on delays seen by the electronic device 52, according to embodiments of the present disclosure. It is noted that, although depicted in a particular order, the blocks of the method 122 may be performed in any suitable order, and at least some blocks may be skipped altogether. As described herein, the method 122 is described as being performed by the base station 50C, however, it should be understood that any suitable processing and/or control circuitry may perform some or all of the operations of the method 122, such as one or more of the processors 12. It is noted that, as described above, the base station 50C transmits to and/or receives messages from the electronic device 52 using frequencies within a frequency range of, for example, the component carrier 56A.

At block 124, the base station 50C may transmit a first packet to the electronic device 52 according to a first communication configuration (e.g., an original communication configuration). The first communication configuration may define a frequency range to use when transmitting the first packet, a frequency to send packets out on the frequency range, one or more allocation patterns (e.g., when downlink communications are scheduled to occur, when uplink communications are scheduled to occur), or the like.

At block 126, the base station 50C may receive an indication of a receive delay from the electronic device 52. The receive delay may be determined by the electronic device 52, such as by using the method 96. The receive delay may communicate (e.g., indicate) to the base station 50C a delay between the first packet and an additional packet from another base station, such as the base station 50B.

Using the receive delay, at block 128, the base station 50C may update the first communication configuration to generate a second communication configuration. The base station 50C may determine that its transmissions lead transmissions from another base station 50B by a particular amount corresponding to the receive delay. In some cases, the base station 50C may analyze the receive delay received from the electronic device 52 along with information received from the base station 50B to determine that the transmissions of the base station 50C lead transmissions from the base station 50B. When generating the second communication configuration, the base station 50C may adjust the first communication configuration to compensate for the receive delay. In this way, the base station 50C may adjust an interruption parameter, such that after receiving a request from the electronic device 52 for an uplink allocation, subsequent allocation operations are delayed by an amount substantially similar or equal to the receive delay (e.g., greater than or less than the receive delay by 0 to 0.5 μs, equal to the receive delay).

At block 130, the base station 50C may apply the second communication configuration (e.g., updated communication configuration) to its software and/or hardware (e.g., replace a previous communication configuration stored in software and/or affecting operation of transceiver circuitry). The application of the second communication configuration to the base station 50C may enable re-alignment of downlink operations and/or uplink operations regardless of communication delays at the electronic device 52 due to proximity differences between the base stations 50 and the electronic device 52.

At block 132, the base station 50C may transmit the second communication configuration (e.g., updated communication configuration) to the electronic device 52. The electronic device 52 may apply the second communication configuration in response to receiving it from the base station 50C. Applying the second communication configuration to both the base station 50C and the electronic device 52 may permit synchronized communications to occur between the two devices on the component carrier 56A.

At block 134, the base station 50C may transmit a second packet to the electronic device 52 according to the second communication configuration (e.g., updated communication configuration). The base station 50C may delay some of its uplink allocations to accommodate delays in the component carrier 56B transmitting packets from the base station 50B to the electronic device 52.

Figure 12:
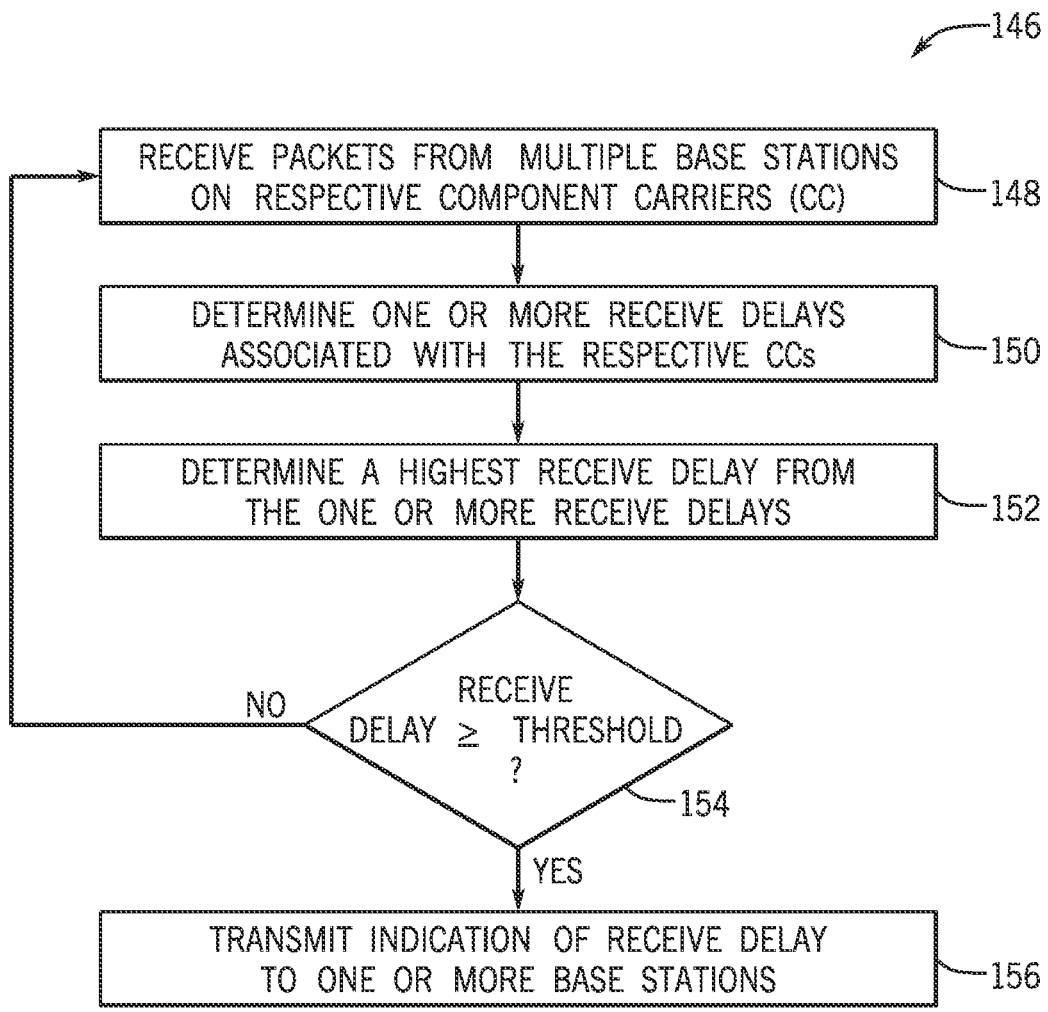
FIG. 12 is a flow chart of a method for operating the electronic device of FIG. 7 to determine a maximum receive delay from receive delays associated with one or more component carriers, according to embodiments of the present disclosure.

In some cases, the electronic device 52 may determine and report a maximum delay determined from multiple determined receive delays. FIG. 12 is a flow chart of a method 146 for operating the electronic device 52 to determine a maximum receive delay from one or more determined receive delays associated with one or more component carriers 56, according to embodiments of the present disclosure. It is noted that, although depicted in a particular order, the blocks of the method 146 may be performed in any suitable order, and at least some blocks may be skipped altogether. As described herein, the method 146 is described as performed by the electronic device 52, however, it should be understood that any suitable processing and/or control circuitry may perform some or all of the operations of the method 146, such as one or more of the processors 12.

At block 148, the electronic device 52 may receive packets from one or more base stations according to respective communication configurations defining scheduling for respective component carriers 56. For example, each communication configuration may define interruption parameters that schedule uplink operations between one or more downlink operations. In this way, transmission parameters and/or frequency of communications on a first component carrier may differ from that of a second component carrier. Furthermore, how long an uplink message is delayed from transmission after a downlink message may also differ between component carriers 56 based at least in part on the communication configuration associated with each of the base stations 50 and/or each of the component carriers 56.

At block 150, the electronic device 52 may determine one or more receive delays indicative of relative delays between communications received on the various component carriers 56. The electronic device 52 may determine the receive delays using methods similar to the method 96 of FIG. After determining one or more receive delays, the electronic device 52 may, at block 152, determine a relatively greater receive delays from the receive delays determined at block 152. In this way, the electronic device 52 may identify the longest delay experienced across each of the component carriers 56.

Once the longest receive delay is identified, the electronic device 52 may, at block 154, determine whether the receive delay is greater than or equal to a threshold amount of time. If the duration is not greater than or equal to the threshold amount of time, then the electronic device 52 may proceed to continue communication operations at block 148.

However, when the electronic device 52 determines that the receive delay is greater than or equal to the threshold amount of time, then the electronic device 52 may, at block 156, transmit an indication of the greatest receive delay to one or more base stations 50 for operational compensations and/or to generate an additional communication configuration. In some cases, this information may be transmitted as user equipment (UE) assistance information and/or as part of a device report to the base stations 50.

Keeping the foregoing in mind, the process 146 of FIG. 12 shows how the electronic device 52 may estimate the timing difference between each of the component carriers 56 and may report a maximum difference between each timing differences (e.g., manifested as receive delays seen by the electronic device 52) to one or more base stations of the base stations 50 as assistance information.

Indeed, in some cases, the electronic device 52 may operate its receiver to receive a first packet at a first time on a first component carrier from a first base station 50, a second packet at a second time on a second component carrier from a second base station 50, a third packet at a third time on a third component carrier from a third base station 50, and so on. The electronic device 52 may use some or all operations of method 146 of FIG. 12 to determining that a difference between the first time and the second time corresponds to a maximum receive time delay (MRTD). To do so, the electronic device 52 may select the second time as a reference time and, using the second time as the reference time, may determine a first difference between the first time and the second time and a second difference between the third time and the second time. The electronic device 52 may identify which of the first difference or the second difference corresponds to the MRTD by comparing the two differences to determine which of the differences is greater. For example, in response to determining that the difference between the first difference is greater than the second difference, the electronic device 52 may identify the first difference as the MRTD (e.g., as representative of a worst-seen delay by the electronic device 52). Furthermore, in some cases, the electronic device 52 verifies whether the difference identified as the MRTD passes a test for synchronization. For example, the electronic device 52 determines whether the first difference (e.g., difference identified as the MRTD) is greater than or equal to a threshold amount of time (e.g., a threshold value used to identify whether two component carriers are out-of-sync or non-synchronous to a suitable amount to justify adjustment). In response to determining that the first difference is greater than the threshold value of time, the electronic device 52 may transmit the first difference as an indication of maximum receive delay to one or more base stations 50 (e.g., each of the first base station 50, the second base station 50, and the third base station 50). The base stations 50 may then adjust communication configurations based on the indication of maximum receive delay from the electronic device 52, including for example, delaying one or more uplink allocations or downlink allocations to better accommodate and/or compensate for delays experienced by the electronic device 52.

The wireless network provider may configure the electronic device 52 to provide the assistance information as part of a measurement object. The configuration of the electronic device 52 may be associated with an identifier of the component carriers 56 and/or an identifier of the cells 54 associated with each base station 50, such as a physical cell identifier (ID). The electronic device 52 may generate and/or repeat determination of the maximum receive time delay (MRTD) difference (referred to interchangeably as "maximum difference") in response to a command from one of the base stations 50 and/or in a periodic manner, such as every day, every hour, or any other suitable time condition. In some cases, the electronic device 52 may monitor delays between the various component carriers 56 and, when one or more delays drift too far from a value (e.g., when a respective receive delay is determined to be greater than a threshold amount of delay), may generate and/or re-determine the maximum difference. It is noted that the electronic device 52 may additionally or alternatively generate and/or re-determine each receive delay for transmission to the base stations 50 in response to an aperiodic condition (e.g., in response to a command from the base station) and/or periodic condition (e.g., each hour, each day, other suitable time condition). For example, the determination of the receive delay and/or the determination of the MRTD may be initiated (e.g., repeated) in response to a radio resource control (RRC) protocol message instructing the determination, in response to a medium access control (MAC) protocol message instructing the determination, in response to a message transmitted via a physical layer signaling instructing the determination, in response to a control signal, according to timing parameters or on a timing schedule (e.g., periodic request), or the like. Indeed, the RRC protocol message, the MAC protocol message, the physical layer signaling, and/or the control signal may respectively be transmitted aperiodically or periodically (e.g., transmitted on a timing-based schedule). It is also noted that the wireless network provider may trigger redetermination of one or more receive delays by commanding the base stations 50 to instruct the electronic device 52 to repeat the determinations.

In some cases, the electronic device 52 may periodically send a physical random-access channel (PRACH) communication on each of the component carriers 56. The PRACH communication may enable each of the base stations 50 to determine timing differences seen by the electronic device 52. In some cases, each of the base stations 50 may receive messages transmitted on each of the component carriers 56, and thus may identify delays in communications when messages are received with delay between each reception (e.g., a delay beyond a threshold amount of time). For example, a base station receiving a first message on a first component carrier at a much later time that a second message on a second component carrier may identify that the first component carrier experiences a delay relative to the second component carrier.

In some cases, however, the electronic device 52 may send two or more PRACH communications on a component carrier to a base station, where a first PRACH communication may have a timing corresponding to the component carrier while a second PRACH communication may have a timing corresponding to another component carrier. The receive delay between the first PRACH communication and the second PRACH communication may then be determined by the base station (e.g., the base station 50B, the base station 50C). It is noted that the electronic device 52 may additionally or alternatively use the PRACH communication to request an uplink allocation from the base stations 50. In this way, at a first time the electronic device 52 may use the PRACH communication to request an uplink allocation, and at a second time the electronic device 52 may transmit an additional PRACH communication to facilitate in the base stations 50 determining a receive delay.

Figure 13:
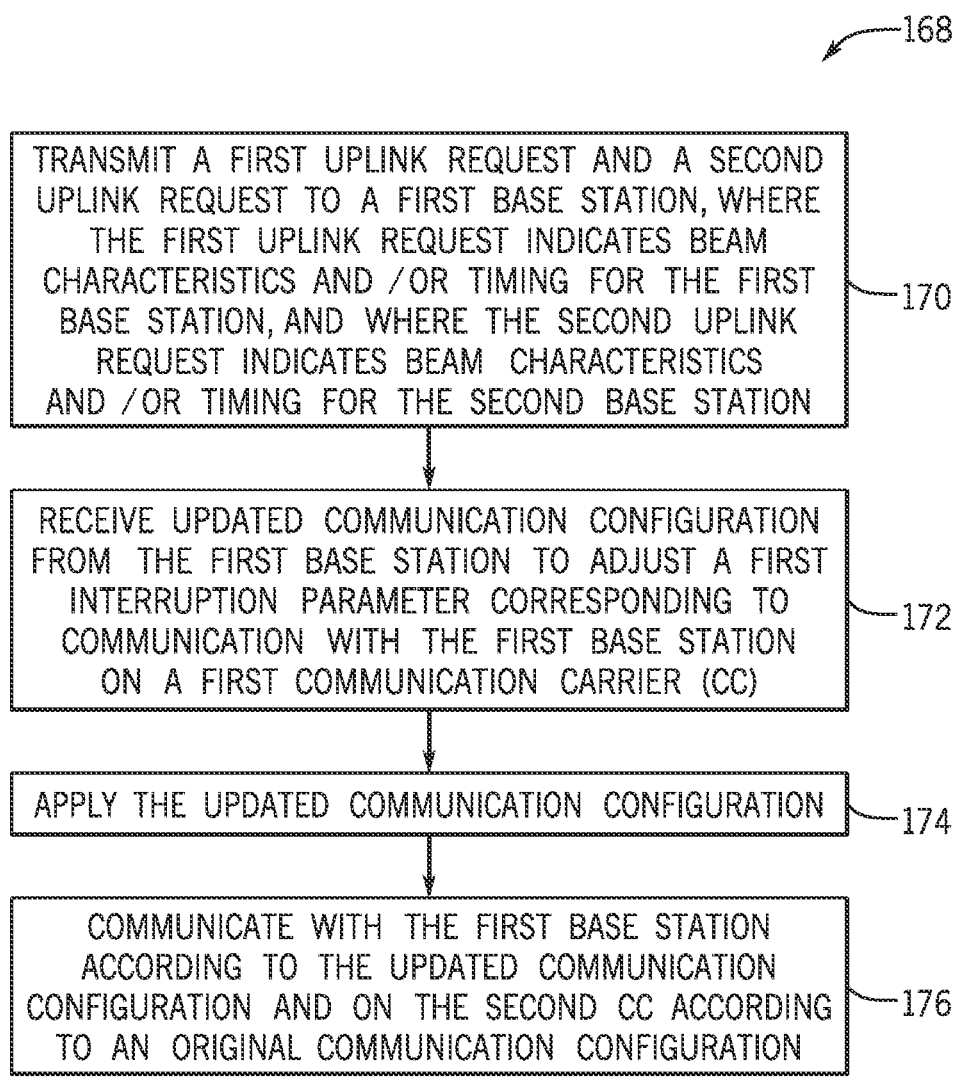
FIG. 13 is a flow chart of a method for operating the electronic device of FIG. 7 to transmit and/or receive RF signals using a communication configuration adjusted based on delays seen by a base station of FIG. 7 when receiving one or more physical random-access channel (PRACH) communications, according to embodiments of the present disclosure.

To elaborate, FIG. 13 is a flow chart of a method 168 for operating the electronic device 52 to transmit or receive RF signals using a communication configuration adjusted based on delays seen by a base station, such as the base station 50C, when receiving one or more PRACH communications, according to embodiments of the present disclosure. It is noted that, although depicted in a particular order, the blocks of the method 168 may be performed in any suitable order, and at least some blocks may be skipped altogether. As described herein, the method 168 is described as performed by the base station 50C, however, it should be understood that any suitable processing and/or control circuitry may perform some or all of the operations of the method 168, such as one or more of the processors 12. It is noted that, as described above, the base station 50C transmits to and/or receives messages from the electronic device 52 using frequencies within a frequency range of the component carrier 56A.

At block 170, the electronic device 52 may transmit a first uplink request and a second uplink request to the base station 50C (e.g., first base station). The first uplink request and the second uplink request may be PRACH communications and/or may be some other suitable packet transmission related to and/or unrelated to uplink allocation requesting operations. The first uplink request may indicate beam characteristics and/or timing for the base station 50C, while the second uplink request may indicate beam characteristics and/or timing for an additional base station, such as base station 50B. The base station 50C, in response to receiving the first uplink request and the second uplink request, may determine a receive timing of the first component carrier 56A relative to the second component carrier 56B using the received beam characteristics and/or timing for the base stations 50B, 50C, and may use the receive timing to update communication configurations for the electronic device 52.

At block 172, the electronic device 52 may receive an updated communication configuration from the base station 50C. The updated communication configuration may adjust an interruption parameter associated with the component carrier 56A to adjust for any relative delays between communications on the component carrier 56A and the component carriers 56B. For example, the updated communication configuration may define communication schedules and/or parameters, such as the interruption parameter, that incorporate adjustments made by the base station 50C to accommodate and/or compensate for a determined difference seen by the electronic device 52 (e.g., the difference or delay between communications received on the component carrier 56A and on the component carrier 56B).

At block 174, the electronic device 52 may apply the updated communication configuration to its software and/or hardware (e.g., replace a previous communication configuration stored in software and/or affecting operation of transceiver circuitry). After application of the updated communication configuration, the electronic device 52 may, at block 176, communicate with the base station 50C according to the updated communication configuration and may communicate with the base station 50B according to the original communication configuration. The original communication configuration may remain applicable to the second component carrier 56B since the adjustments to the communication configuration used to communicate via the first component carrier 56A were made relative to the detected timing and/or detected communication pattern of the second component carrier 56B.

Figure 14:
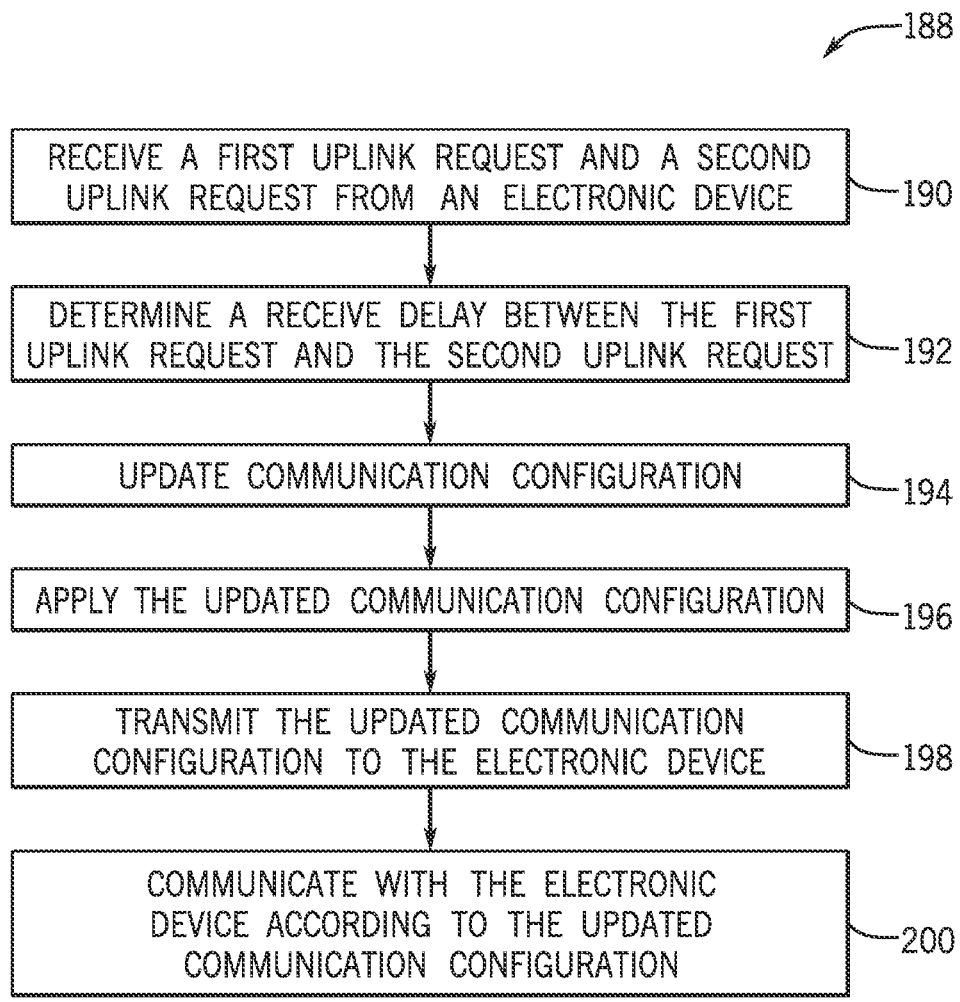
FIG. 14 is a flow chart of a method for operating a base station of FIG. 7 to transmit or receive RF signals using a communication configuration adjusted based on delays seen by the base station of FIG. 7 when receiving one or more physical random-access channel (PRACH) communications, according to embodiments of the present disclosure.

To elaborate further on the operation of the base station 50C during performance of the method 168, FIG. 14 is a flow chart of a method 188 for operating a base station, such as the base station 50C, to transmit or receive RF signals using a communication configuration adjusted based on delays seen by the base station, according to embodiments of the present disclosure. It is noted that, although depicted in a particular order, the blocks of the method 188 may be performed in any suitable order, and at least some blocks may be skipped altogether. As described herein, the method 188 is described as performed by the base station 50C, however, it should be understood that any suitable processing and/or control circuitry may perform some or all of the operations of the method 188, such as one or more of the processors 12. It is noted that, as described above, the base station 50C transmits to and/or receives messages from the electronic device 52 using frequencies within a frequency range of the component carrier 56A.

At block 190, the base station 50C may receive a first uplink request and a second uplink request from the electronic device 52. The electronic device 52 may transmit the first uplink request and the second uplink request to the base station 50C. The first uplink request and the second uplink request may be a PRACH communication and/or may be some other suitable packet transmission related and/or unrelated to uplink allocation requesting operations. The first uplink request may indicate beam characteristics and/or timing for the base station 50C, while the second uplink request may indicate beam characteristics and/or timing for an additional base station, such as base station 50B.

At block 192, the base station 50C may determine a receive timing of the first communication carrier 56A in response to receiving the first uplink request and the second uplink request. The receive timing may be determined by the base station 50C relative to the second communication carrier 56B based on the beam characteristics and/or timing for the base stations 50B, 50C. The base station 50C may use the receive timing to update communication configurations for the electronic device 52.

The base station 50C may, at block 194, generate an updated communication configuration (e.g., update communication configuration) to be applied to communications with the electronic device 52. The updated communication configuration may adjust an interruption parameter associated with the component carrier 56A to adjust for any relative delays between communications on the component carrier 56A and the component carriers 56B.

At block 196, the base station 50C may apply the updated communication configuration to its software and/or hardware (e.g., replace a previous communication configuration stored in software and/or affecting operation of transceiver circuitry) used for communicating with the electronic device 52 over the component carrier 56A. At block 198, the base station 50C may transmit the updated communication configuration to the electronic device 52, so that the electronic device 52 may also apply the updated communication configuration. The updated communication configuration may be transmitted to the electronic device 52 using transmission parameters associated with an original communication configuration and/or the communication configuration adjusted to generate the updated communication configuration. Furthermore, the base station 50C may apply the updated communication configuration at least partially at the same time as transmitting the updated communication configuration to the electronic device 52.

After application of the updated communication configuration, the base station 50C may, at block 200, communicate with the electronic device 52 according to the updated communication configuration. It is noted that the electronic device 52 may communicate with the base station 50B according to a different communication configuration, such as a communication configuration unchanged from an original communication.

In some cases, these systems and methods described above may be applied to systems that use different frequencies of message transmissions between component carriers 56. To elaborate, FIG. is a timing diagram illustrating two example communication configurations for two component carriers 56, such as component carrier 56A and component carrier 56B, according to embodiments of the present disclosure. The base stations 50 corresponding to the component carriers 56 may use different transmission numerologies when sending packets to the electronic device 52, and in this way may transmit packets at a different frequency using different frequency ranges within a same frequency band. Transmission numerologies may be defined in Table 1.

For each mu-value (e.g., $\mu=0$, 1, 2, 3, 4), a subcarrier frequency may be defined. For example, when the numerology equals 0 (e.g., $\mu=0$), packets are sent by the base stations 50C at a rate substantially equal to 15 kilohertz (kHz) on the frequency range corresponding to the component carrier 56A.

TABLE 1

| Numerology ($\mu$) | $\Delta f = 2^{\mu} * 15[kHz]$ |
|---|---|
| 0 | 20 |
| 1 | 30 |
| 2 | 60 |
| 3 | 120 |
| 4 | 240 |

It is noted that each numerology may or may not correspond to a same cyclic prefix length (e.g., a same length of the prefix 80). Furthermore, any of the other examples described may be used in combination with the mixed numerology deployments described in association with FIG. 15. When the numerology changes of communications on the component carriers 56, time periods when the uplink communications of one component carrier overlaps with downlink communications of another component carrier may change.

Take, for example, the case where component carrier 56A has a numerology of 2 (e.g., $\mu=2$) and component carrier 56B has a numerology of 3 (e.g., $\mu=3$). This may correspond to the communication schedule depicted in FIG. 15. As may be appreciated, symbols 210 corresponding to the component carrier 56B (e.g., symbol 210A, symbol 210B, symbol 210C) occur at a higher frequency of repetition (e.g., 120 kHz for $\mu=3$) than the symbols 210 corresponding to the component carrier 56A (e.g., symbol 210D, symbol 210E, symbol 210F), which has a relatively slower frequency of repetition (e.g., 60 kHz for $\mu=2$). To reduce a likelihood (e.g., reduce, reduce to zero chance) of an undesired number of symbols 210 being dropped for either of the component carriers 56, the base stations 50 and/or the electronic device 52 may adjust communication configurations for use when transmitting on one or more of the component carriers 56 based on the numerology associated with the component carriers 56.

In particular, the communication configurations may be adjusted to change the adjustment (e.g., variable adjustment 84, constant adjustment 74) used to delay an uplink allocation 212 for transmission of uplink messages 76. The adjustments to a number of symbols 210 used to pause downlink operations on component carrier 56A and component carrier 56B may follow relationships presented in the tables below, Table 2, Table 3, and/or Table 4. Each of Tables 1~4 presume receive delay ranges between 0 and 8 vs.

TABLE 2

| Numerology ($\mu$) of CC1 | Number of Symbol Interruptions before CC1 Uplink Allocated Symbol | Number of Symbol Interruptions after CC1 Uplink Allocated Symbol |
|---|---|---|
| 2 | 1 | 0 |
| 3 | 2 | 0 |
| 4 | 4 | 0 |

TABLE 3

Number of Symbol Interruptions of CC2 before CC1 Uplink Allocated Symbol

| | Numerology ($\mu$) of CC1 | | |
|---|---|---|---|
| Numerology ($\mu$) of CC2 | 2 | 3 | 4 |
| 2 | 2 | 2 | 2 |
| 3 | 3 | 3 | 3 |
| 4 | 5 | 5 | 5 |

TABLE 4

Number of Symbol Interruptions of CC2 after CC1 Uplink Allocated Symbol

| | Numerology ($\mu$) of CC1 | | |
|---|---|---|---|
| Numerology ($\mu$) of CC2 | 2 | 3 | 4 |
| 2 | 1 | 0 | 0 |
| 3 | 2 | 1 | 1 |
| 4 | 5 | 3 | 2 |

Figure 15:
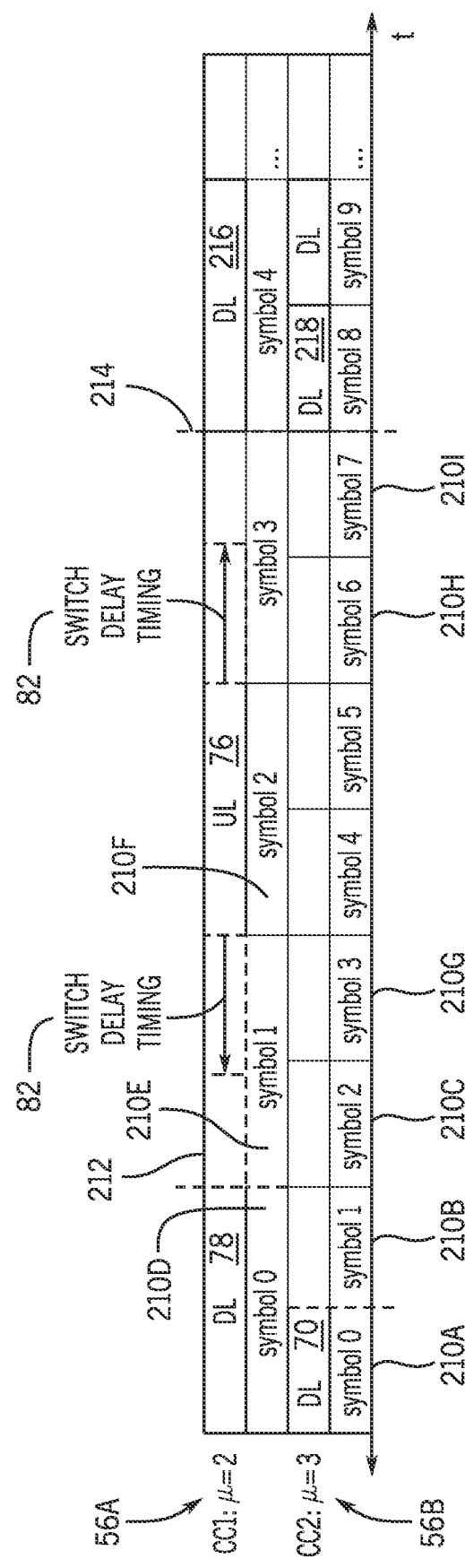
FIG. 15 is a timing diagram illustrating two example communication configurations for two component carriers associated with base stations of FIG. 0.7, according to embodiments of the present disclosure.

For example, in the case in FIG. 15, the component carrier 56B has its downlink communications interrupted (e.g., paused, delayed) by the base station 50B 3 symbols 210 (e.g., symbol 210B, symbol 210C, symbol 210G) before the symbol 210F of the component carrier 56A (e.g., the symbol allocated for uplink messages 76). However, if the component carrier 56B was of numerology 4 (e.g., $\mu$=4), the downlink communications may be interrupted 5 symbols before the symbol 210F. The component carrier 56B is also shown as continuing to have its downlink communications interrupted for two symbols 210 (e.g., symbol 210H, symbol 210I) after the symbol 210F. Once the interruption period ends, such as at time 214, substantially simultaneous downlink operations continue on the component carrier 56A and/or the component carrier 56B, such as with downlink communication 216 and/or downlink communication 218. It is noted that the transition time used to prepare circuitry of the base station 50C and/or the electronic device 52 for the uplink message 76 may be included in the symbols 210 as the duration 82.

In Table 2, updates to the communication configuration used to transmit signals on component carrier 56A takes care of any delay in resuming downlink operations for the base station 50C after the end of the symbol 210F, and thus these parameters are set to 0. In some cases, however, it may be desired for this delay to be nonzero, and thus it is noted that any number of symbols 210 after the symbol 210F may be unallocated and used to further delay downlink communications, if desired. Furthermore, the numerology 0 through 4 may correspond to New Radio (NR) and/or $5^{th}$ generation (5G) component carriers 56 (e.g., component carriers 56 defined to operate in frequency ranges associated with NR wavelengths) while the numerology 0 may correspond to Long Term Evolution (LTE) component carriers and/or $4^{th}$ generation (4G) component carriers 56 (e.g., component carriers 56 defined to operate in frequency ranges associated with LTE wavelengths). The Table 2, Table 3, and/or Table 4 represent one example of numerology and symbol interruption definitions that may be used when implementing a wireless network, but it should be understood that any suitable combination of symbol delays and/or communication configurations may be used.

Figure 16:
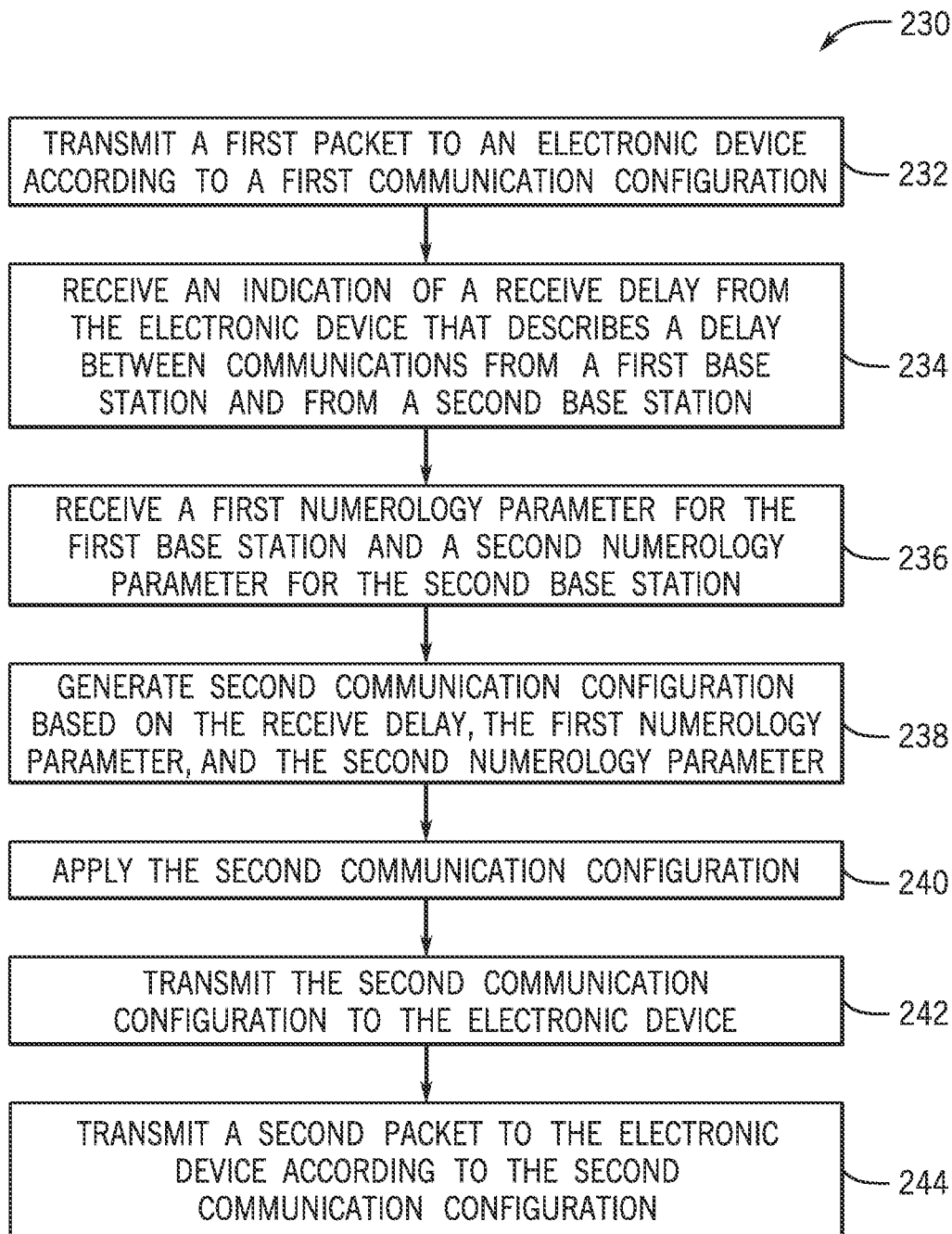
FIG. 16 is a flow chart of a method for operating the base station of FIG. 7 to transmit and/or receive RF signals using a communication configuration adjusted based on delays seen by the base station of FIG. 7 when receiving one or more physical random-access channel (PRACH) communications, according to embodiments of the present disclosure.

To elaborate further on the operation of the base stations 50 when considering numerologies, FIG. 16 is a flow chart of a method 230 for operating a base station, such as the base station 50C, to transmit and/or receive RF signals using a communication configuration adjusted based on delays seen by the base station and based on numerologies associated with the base stations 50 communicating with the electronic device 52, according to embodiments of the present disclosure. It is noted that, although depicted in a particular order, the blocks of the method 230 may be performed in any suitable order, and at least some blocks may be skipped altogether. As described herein, the method 230 is described as performed by the base station 50C, however, it should be understood that any suitable processing and/or control circuitry may perform some or all of the operations of the method 230, such as one or more of the processors 12. It is noted that, as described above, the base station 50C transmits to and/or receives messages from the electronic device 52 using frequencies within a frequency range of the component carrier 56A.

At block 232, the base station 50C may transmit a first packet to the electronic device 52 according to a first communication configuration on the component carrier 56A. At block 234, the base station 50C may receive an indication of a receive delay from the electronic device 52 that describes a communication delay experienced by the electronic device 52 between communications from at least the base station 50C and the base station 50B. In this way, it is noted that the electronic device 52 may transmit a maximum receive delay to the base station 50C representative of a worst-case delay seen by the electronic device 52 at a particular time and/or may transmit each determined receive delay to the base station 50C. Furthermore, it is noted that the base station 50C, in some cases, may receive one or more signals, such as a PRACH communication, from the electronic device 52 and may use the one or more signals to determine the receive delay between the signals itself. These embodiments described may align with some or all of the operations described above with regard to other figures.

At block 236, the base station 50C may receive a first numerology parameter for the base station 50B and a second numerology parameter for the base station 50C (e.g., determine its own numerology parameter by retrieving from memory). As described above, each respective numerology parameter may determine a respective frequency of packet transmission occurrence for sending packets on signals within a frequency range corresponding to a component carrier of the respective base station In this way, each of the base stations 50 may operate according to two frequencies—a first frequency associated with a frequency range for transmitting signals, and a second frequency associated with how fast an additional message is scheduled for transmission and/or a number of occurrences of symbols 210 within a set duration of time.

At block 238, the base station 50C may generate a second communication configuration (e.g., may update the first communication configuration) based on the receive delay, the first numerology parameter, and the second numerology parameter. When generating the second communication configuration, the base station 50C may reference look-up tables stored in memory, similar to memory 14 and/or nonvolatile storage 16, indicative of information shown in Table 1, Table 2, Table 3, and/or Table 4. In some cases, the base station 50C may include processors, similar to the processor 12, that execute code stored in memory, similar to memory 14 and/or nonvolatile storage 16, to run through logical conditions to determine a suitable schedule for the symbols 210 for the component carrier 56A and/or the component carrier 56B. It is noted that the base station 50C may determine the second communication configuration such that the second communication configuration defines operation for communicating on the component carrier 56A and/or the component carrier 56B. However, in some cases, the base station 50B may determine its own communication configuration based at least in part on the numerology parameters for the base stations 50 and/or the receive delay.

Once the second communication configuration is generated, the base station 50C may, at block 242, transmit the second communication configuration to the electronic device 52. The electronic device 52 and/or the base station 50C may apply the second communication configuration to prepare to communication without interfering downlink operations associated with the base station 50B. After applying the second communication configuration to the electronic device 52 and/or the base station at block 244, the base station 50C may transmit a second packet to the electronic device 52 according to the second communication configuration.

In some cases, the electronic device 52 may include multiple antenna panels. Each antenna panel of the electronic device 52 may include an antenna element, an array of antenna elements, or multiple antenna arrays. Having two or more antenna panels may mean that the electronic devices 52 is able to perform uplink operations on a first component carrier simultaneously to downlink operations on a second component carrier, or vice versa, without an interruption to operations occurring (e.g., at least partially simultaneous uplink operations and downlink operations). Accordingly, the previous embodiments may be performed on an electronic device 52 having one or more antenna panels (including an electronic device 52 having only one antenna panel), while the following embodiments may be performed on an electronic device 52 having more than one antenna panel. When the electronic device 52 does not include multiple antenna panels, or when the electronic device 52 receives two or more component carriers 56 using a same antenna panel, the electronic device 52 may be said to support non-simultaneous uplink operations and downlink operations, and may operate with consideration for delaying downlink communications in response to an incoming uplink communication.

Figure 17:
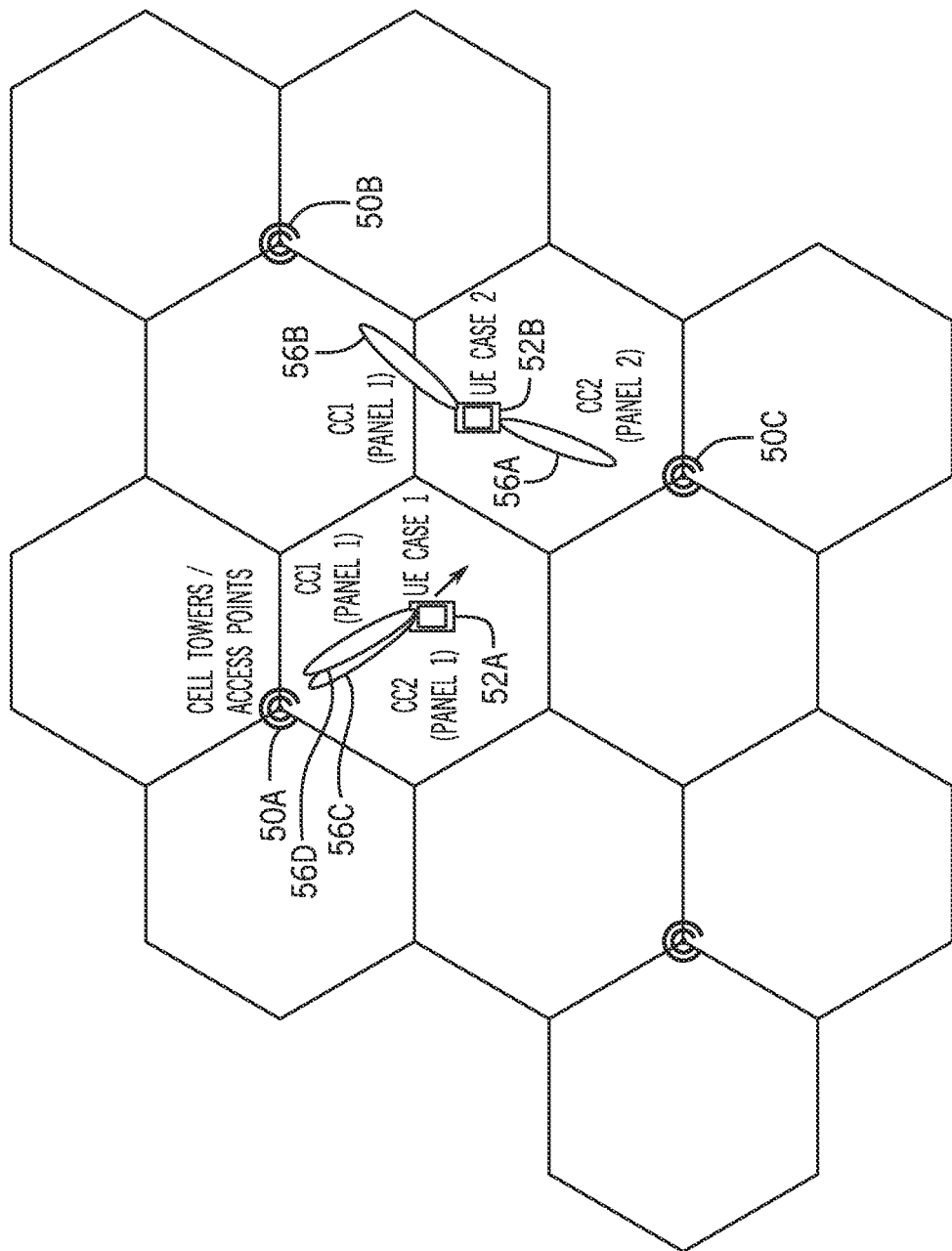
FIG. 17 is an illustration of electronic devices, similar to the electronic device of FIG. 7, communicating with base stations using antenna panels, according to embodiments of the present disclosure.

FIG. 17 provides an example of this operation. FIG. 17 is an illustration of a first electronic device 52A and a second electronic device 52B, according to embodiments of the present disclosure. The electronic devices 52A, 52B both include at least two antenna panels. The electronic device 52A shows an example operation where the electronic device 52A receives communications on two of the component carriers 56 (e.g., component carrier 56C, component carrier 56D) on a same panel while the electronic device 52B shows an example operation where the electronic device 52B receives communications on a first component carrier (e.g., component carrier 56A) that may be simultaneous to communications on a second component carrier (e.g., component carrier 56B). The electronic device 52B is able to receive at least partially simultaneous uplink communications and downlink communications since the electronic device 52B receives the signals on the component carrier 56A on an antenna panel different from the antenna panel used to receive signals on the component carrier 56B.

It is noted that, as the electronic device 52A and/or the electronic device 52B physically move, and thus receive signals at different angles and/or at different amplitudes, distribution of which antenna panels receive signals from which of the component carriers 56 may change. For example, an electronic device 52 may operate according to the example case corresponding to the electronic device 52A, but may move location and, at a second time, operate according to the example case corresponding to the electronic device 52B.

To account for changes in operational mode of the electronic device 52, such as from a simultaneous operational mode to a non-simultaneous operational mode, or vice versa, the electronic device 52 may indicate to one or more base stations 50 whether it is able to receive overlapping uplink communications and downlink communications from different component carriers. For example, the electronic device 52A may provide an indication to the base station 50A communicating that the electronic device 52A is unable to receive overlapping uplink communications and downlink communications from the component carrier 56C and from the second component carrier 56D. However, the electronic device 52B may provide an indication to the base station 50B and/or the base station 50C communicating that the electronic device 52B is able to receive at least partially overlapping uplink communications and downlink communications from the component carrier 56A and the component carrier 56B, since packets on these subsets of component carriers 56 may be received on respective antenna panels.

In some cases, the electronic device 52 may permit simultaneous communications on a frequency band without permitting simultaneous communications between one or more component carriers of the frequency band. Although not particularly described, other combinations of considerations between frequency bands and/or component carriers may also be permitted. It is noted that these methods may be combined with any of the other described methods herein. For example, descriptions associated with at least FIG. 17 may be combined with operations of FIG. 12 as an enhancement to further improve operations of FIG. 12, such as to permit simultaneous transmit and receive operations while also considering receive delays (e.g., MRTD) between communications from different base stations 50 or on different component carriers 56. Indeed, user equipment (UE) assistance information discussed herein that includes receive timing difference information (e.g., indications of MRTD seen by the electronic device 52) may also be combined with a capability of an electronic device 52 for simultaneous transmit and receive operations, such as when the electronic device 52 includes a suitable number of antenna circuitry to simultaneously transmit and receive communications. The combined operations may be discussed with respect to at least FIGS. 18 and 19.

The electronic device 52 may, thus, indicate which component carriers 56 may be activated for simultaneous transmission and reception operations (e.g., simultaneous uplink and downlink operations) and/or may indicate which frequency bands that include one or more component carriers 56 may be activated for simultaneous transmission and reception operations, and may indicate when the electronic device 52 may no longer support simultaneous transmission and reception operations. Furthermore, the electronic device 52 may provide an indication to the base stations 50 which combination of component carriers 56 and/or frequency bands may be used to support simultaneous transmission and reception operations. The indication provided to the base stations 50 from the electronic device 52 may be a flag, a message, a control signal, or the like.

Figure 18:
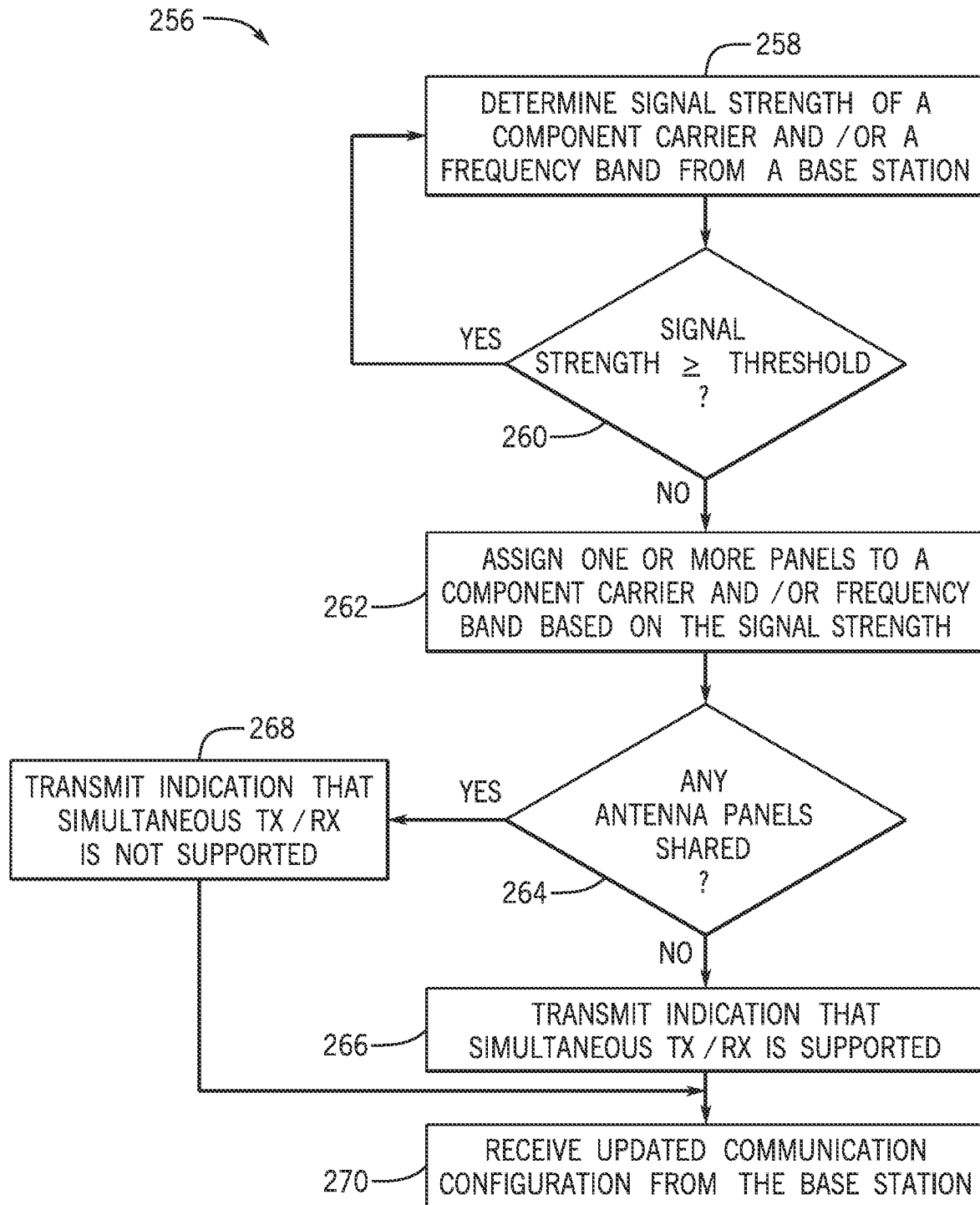
FIG. 18 is a flow chart of a method for operating the electronic device of FIG. 7 to determine which operational mode is suitable to use when communicating with one or more base stations of FIG. 7 based on antenna panels of the electronic device of FIG. 7, according to embodiments of the present disclosure.

To elaborate further on the operation of the electronic device 52 in these cases, FIG. 18 is a flow chart of a method 256 for operating the electronic device 52 to determine which operational mode is suitable to use when communicating with one or more base stations 50 based at least in part on antenna panels of the electronic device 52, according to embodiments of the present disclosure. It is noted that, although depicted in a particular order, the blocks of the method 256 may be performed in any suitable order, and at least some blocks may be skipped altogether. As described herein, the method 256 is described as performed by the electronic device 52, however, it should be understood that any suitable processing and/or control circuitry may perform some or all of the operations of the method 256, such as one or more of the processors 12.

At block 258, the electronic device 52 may determine a signal strength and/or amplitude of signals received on one or more component carriers 56 and/or a frequency band used by one or more base stations 50 to communicate with the electronic device 52. The determination by the electronic device 52 to support simultaneous transmission and reception operations on certain frequency ranges at certain antenna panels may be made on signal quality, thresholding (e.g., whether a signal strength is greater than a threshold amount), signal power, signal strength, other monitoring parameters, or the like. In this way, the electronic device may monitor the component carriers 56 to determine which panel to use to communicate on one or more of the component carriers 56 (and to determine with which base stations 50 to communicate). Geometry of an antenna panel may limit and/or adjust the range or geographical boundaries for each antenna panel. For example, the geometry of the antenna panel may include a number and/or type of antenna, a number and/or type of antenna amplifier, or the like.

The electronic device 52 may determine, at block 260, that a detected signal is greater than or equal to a threshold signal strength, thereby warranting classification of a frequency range of the signal to an antenna of the electronic device 52. A value of the threshold signal strength may be based on a sensitivity of the antenna circuitry of the antenna panel and/or may be valued such that signals having an amplitude or detected signal strength of that of detectable noise are ignored. For example, signals characterized by a signal-to-noise ratio (SNR) of 0 decibels (dB) or greater may include sufficiently low levels of noise to be detected (e.g., threshold signal strength equaling approximately 0 dB). In some cases, signals characterized by a SNR of between −20 dB and 0 dB may be considered as greater than or equal to the threshold signal strength (e.g., where threshold signal strength equals approximately −20 dB). Once classified and/or identified as having a suitable strength, the electronic device 52 may use the component carrier carrying the signal to further communicate with its corresponding base station.

When the signal is not greater than or equal to the threshold signal strength, the electronic device 52 may, at block 258, repeat a determination of signal strength to attempt to identify a component carrier to use for communication. However, when the signal is greater than or equal to the threshold signal strength, the electronic device 52 may, at block 262, assign one or more antenna panels to the component carrier (e.g., the frequency range) corresponding to the detected signal of suitable strength. The electronic device 52 may assign component carriers 56 to one or more antenna panels by using any suitable method, such as by tuning the antenna panel and/or supporting communication circuitry to the frequency range of one or more of the component carriers 56. The electronic device 52 may maintain a log that indicates which antenna panel is tuned to which component carrier. The log may be stored in memory, such as memory 14 and/or nonvolatile storage 16, and accessed at a later time, such as to determine which antenna panel is assigned to multiple component carriers 56.

Once one or more antenna panels are assigned, the electronic device 52 may, at block 264, determine whether any of the assigned antenna panels are shared between one or more component carriers 56 and/or frequency bands of the base stations 50. In this way, the electronic device 52 may determine whether an antenna panel is assigned to a first component carrier and to a second component carrier.

When the electronic device 52 determines that one or more antenna panels are not shared, the electronic device 52 may, at block 266, generate and transmit an indication to one or more base stations 50 that communicates that simultaneous communication is supported. The base stations 50 that receive the indication may each communicate on frequency ranges that are not received at a same antenna panel.

However, when, at block 264, the electronic device 52 determines that one or more antenna panels are shared, the electronic device 52 may, at block 268, transmit an indication to one or more base stations 50 communicating that the electronic device 52 is not able to receive simultaneous communications at each respective shared antenna panel. The electronic device 52 may transmit an indication to each base station that is expected to communicate using the component carrier received by the shared antenna panel. In some cases, the electronic device 52 may identify a frequency range of a packet received when determining the signal strength at block 258, and may use the identified frequency range to transmit the indication to the base station. The base stations 50 and/or the electronic device 52 may proceed to operate according to methods described herein where receive delays are considered when delaying downlink operations and/or assigning uplink allocations, such as methods described in at least FIG. 9 and/or FIG. 10. Considering receive delays may permit the base stations 50 sending packets on a frequency range to an antenna panel shared by another frequency range to reduce a likelihood of overlapping downlink operations and uplink operations occurring, thereby improving communication operations of the wireless network.

In response to transmitting the indications at block 266 and/or block 268, the electronic device 52 may, at block 270, receive an updated communication configuration from one or more base stations 50 to reconfigure how the electronic device 52 is to communicate with the one or more base stations 50. Similar to as described above, the electronic device 52 may communicate with the base stations 50 after applying the updated communication configuration to avoid any unpermitted simultaneous uplink communications and downlink communications, thereby improving communication operations between the electronic device 52 and the base stations 50. The electronic device 52 may adjust operation of its receiver and/or its transmitter when applying the updated communication configuration.

Figure 19:
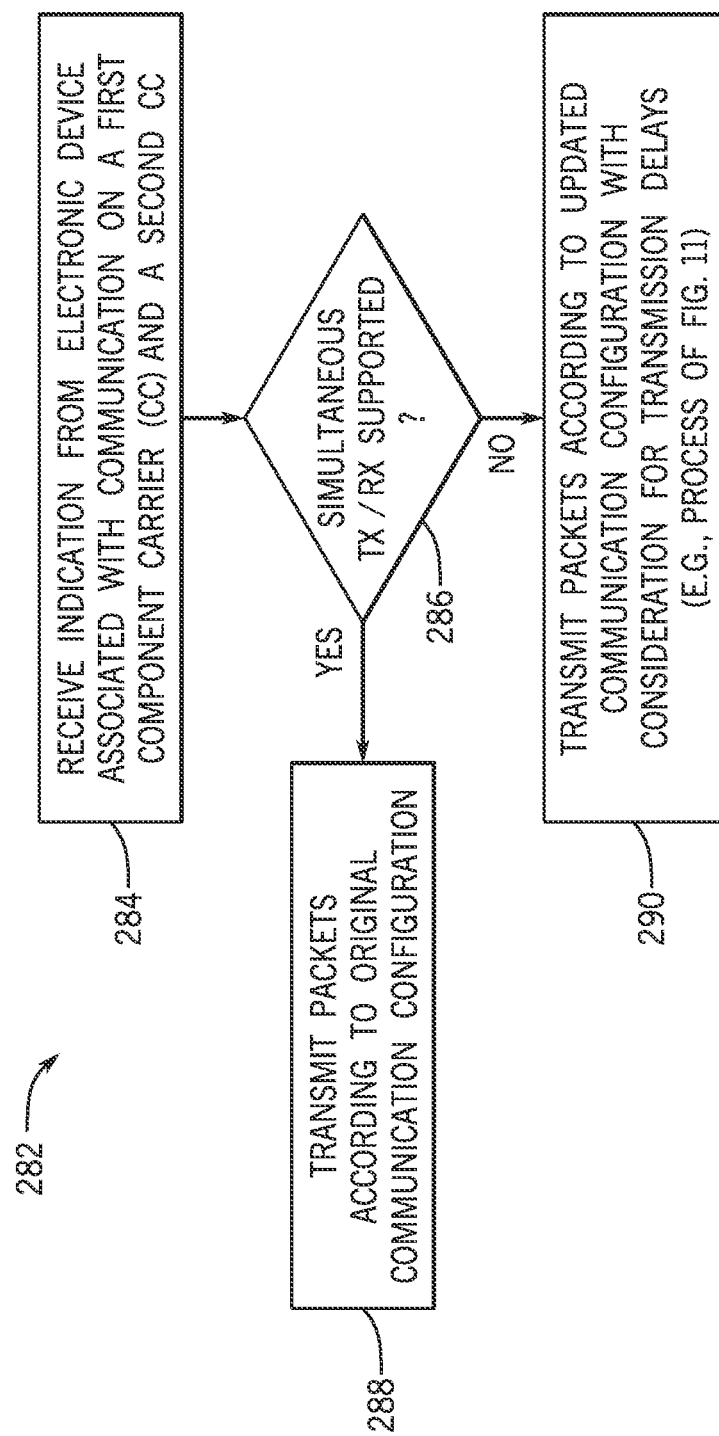
FIG. 19 is a flow chart of a method for operating the base station of FIG. 7 to determine which operational mode to use when communicating with the electronic device of FIG. 7 based on the antenna panels of the electronic device of FIG. 7, according to embodiments of the present disclosure.

To elaborate further on the operation of the base stations 50 when considering indications from the electronic device 52 on whether simultaneous (e.g., overlapping) communications between component carriers 56 is permitted, FIG. 19 is a flow chart of a method 282 for operating a base station, such as the base station 50C, to communicate with the electronic device 52 based at least in part on antenna panels of the electronic device 52, according to embodiments of the present disclosure. It is noted that, although depicted in a particular order, the blocks of the method 282 may be performed in any suitable order, and at least some blocks may be skipped altogether. As described herein, the method 282 is described as performed by the base station 50C, however, it should be understood that any suitable processing and/or control circuitry may perform some or all of the operations of the method 282, such as one or more of the processors 12. It is noted that, as described above, the base station 50C transmits to and/or receives messages from the electronic device 52 using frequencies within a frequency range of the component carrier 56A.

At block 284, the base station 50C receive an indication from the electronic device 52 associated with communication on one or more component carriers 56 (e.g., first component carrier, second component carrier). The indication may be the same indication generated by the electronic device 52 at block 266 and/or block 268 of the method 256. The base station 50C may, at block 286, determine whether simultaneous transmission and/or reception is supported. In other words, the base station 50C may determine whether uplink operations and downlink operations may occur at least partially simultaneous to each other. The base station 50C may interpret a voltage level and/or data transmitted as the indication to determine whether the electronic device 52 is operating to permit simultaneous communications from one or more component carriers 56.

When the base station 50C determines that the indication communicates that the electronic device 52 is able to process simultaneous downlink and uplink operations, the base station 50C may, at block 288, transmit one or more packets on the component carrier 56A according to an original communication configuration (e.g., a first communication configuration that is not updated) without consideration for whether overlapping downlink operations and uplink operations are expected to occur and/or without consideration for transmission delays associated with at least one other component carrier. However, when the base station 50C determines that the indication is communicating that the electronic device 52 is unable to process simultaneous downlink operations and uplink operations, the base station 50C may, at block 290, transmit one or more packets according to an updated communication configuration. The updated communication configuration may be generated using one or more of the above-described systems and/or methods, and thus may consider transmission delays when being generated and applied.

Keeping the foregoing in mind, in some cases, one or more base stations 50 may estimate the receive delay and/or have access to an indication of a receive delay to apply to communication configurations. For example, the receive delay may be hardcoded at an installation of one or more of the base stations 50, and thus may be accessible in memory to the one or more processors 12 of the base stations 50. In other cases, the base stations 50 may include separate transceiver circuitry to send signals to and/or receive signals from neighboring base stations 50. Inter-base station communication may enable the base stations 50 to determine a receive delay expected to be seen by the electronic device 52. This process may involve triangulation processes and/or analyzing global positioning service (GPS) data associated with a physical location of the electronic device 52 relative to physical locations of the base stations 50 to determine the receive delay.

Furthermore, it is noted that component carriers 56 may operate contiguously in a same frequency band (e.g., referred to as intra-band contiguous carrier aggregation), non-contiguously in a same frequency band but separated by one or more frequency gaps (e.g., referred to as intra-band non-contiguous carrier aggregation), and/or in different frequency bands (e.g., inter-band carrier aggregation). The base stations 50 may receive from and/or transmit to a downlink control information (DCI). The DCI may include information used to schedule downlink data channel (e.g., Physical Downlink Shared Channel (PDSCH)) and/or to schedule uplink data channels (e.g., Physical Uplink Shared Channel (PUSCH)). Additionally or alternatively, the base stations 50 may receive a media access control protocol address (MAC address) that uniquely identifies a network interface controller (NIC), and which may be used as a network address in communications within a network segment, such as to identify communications to and/or from the electronic device 52. The base stations 50 may use processes, such as Radio Resource Control (RRC) protocol processes, to transmit messages between base stations 50 of a radio network (e.g., wireless network provided by base stations 50) and/or between the electronic device 52. Furthermore, the base stations 50 may include an access management device that performs operations, such as Access and Mobility Management Functions (AMF), associated with deployment of the radio network (e.g., wireless network, cellular network, core network of a cellular service provider). The access management device may also perform operations associated with registering and/or maintain information associated with user devices accessing and/or attempting to access the radio network, such as User Plane Functions (UPF). In this way, access management device of each base station 50 may access permissions associated with SIM cards of the electronic device 52 when registering the electronic device 52 to the wireless network.

Technical effects of the present disclosure include systems and methods for operating transceiver circuitry to transmit or receive signals on various frequency ranges. Frequency ranges may be used to define component carriers, and some electronic devices may be unable to perform simultaneous uplink operations and downlink operations. Operations that delay performance of downlink operations when an uplink operation is to be performed may be improved by considering delays experienced by an electronic device when receiving messages (e.g., packets) on different component carriers originating from base stations disposed different distances from the electronic device. For example, the uplink operation allocation may be scheduled to occur at a later time than what is permitted from a previous downlink operation to improve alignment of the uplink operation allocation to a downlink operation allocation for a different component carrier.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A user equipment comprising:
   antenna circuitry; and
   processing circuitry communicatively coupled to the antenna circuitry, wherein the processing circuitry is configured to
      assign a first component carrier from a first network node and a second component carrier from a second network node to different portions of the antenna circuitry,
      operate the antenna circuitry to transmit, to the first network node via the first component carrier, an indication that simultaneous uplink operations and downlink operations are permitted, and
      operate the antenna circuitry to receive a first signal via the first component carrier at a same time as transmitting a second signal via the second component carrier.

2. The user equipment of claim 1, wherein the processing circuitry is configured to operate the antenna circuitry to receive the first signal via the first component carrier at the same time as transmitting the second signal via the second component carrier at least in part by:
   operating, via the processing circuitry, the antenna circuitry to receive the first signal from the first network node via the first component carrier over a first time duration; and
   operating, via the processing circuitry, the antenna circuitry to transmit the second signal to the second network node via the second component carrier over a second time duration, wherein the first time duration and the second time duration overlap.

3. The user equipment of claim 1, wherein the processing circuitry is configured to assign the first component carrier and the second component carrier to the different portions of the antenna circuitry at least in part by assigning a first portion of the antenna circuitry to the first component carrier and a second portion of the antenna circuitry to the second component carrier.

4. The user equipment of claim 3, wherein the processing circuitry is configured to operate the first portion of the antenna circuitry to transmit, to the first network node, the indication that simultaneous uplink operations and downlink operations are permitted with the antenna circuitry based on assigning the first portion of the antenna circuitry to the first component carrier and the second portion of the antenna circuitry to the second component carrier.

5. The user equipment of claim 1, wherein the processing circuitry is configured to assign the first component carrier and the second component carrier to the different portions of the antenna circuitry based on a signal strength.

6. The user equipment of claim 1, wherein the first component carrier and the second component carrier correspond to different frequency ranges.

7. The user equipment of claim 1, wherein the different portions of the antenna circuitry comprise different antenna panels.

8. A method, comprising:
   receiving, via processing circuitry configured to operate antenna circuitry, an indication of a first network node via a first component carrier and an indication of a second network node via a second component carrier;
   assigning, via the processing circuitry, the first component carrier and the second component carrier to different portions of the antenna circuitry;
   operating, via the processing circuitry, the antenna circuitry to receive at least a first signal from the first network node via the first component carrier at a first time; and
   operating, via the processing circuitry, the antenna circuitry to transmit at least a second signal to the second network node via the second component carrier at the first time.

9. The method of claim 8, comprising receiving a first communication configuration, the first communication configuration being configured to cause the processing circuitry to operate the antenna circuitry in the first component carrier and the second component carrier contiguously in a same frequency band, non-contiguously in the same frequency band, or in different frequency bands.

10. The method of claim 8, comprising determining to permit simultaneous uplink operations and downlink operations based on assigning the first component carrier and the second component carrier to the different portions of the antenna circuitry.

11. The method of claim 10, comprising operating the antenna circuitry to transmit an indication of the permitted simultaneous uplink operations and downlink operations to the first network node via the first component carrier.

12. The method of claim 8, comprising assigning, via the processing circuitry, the first component carrier and the second component carrier to the different portions of the antenna circuitry based on a signal strength.

13. The method of claim 12, comprising
   determining that the signal strength crosses a threshold amount of signal strength; and
   assigning the first component carrier and the second component carrier to the different portions of the antenna circuitry based on determining that the signal strength crosses the threshold amount of signal strength.

14. The method of claim 8, comprising tuning a respective portion of the antenna circuitry from a third component carrier to the first component carrier based on assigning that respective portion of the antenna circuitry to the first component carrier.

15. A method, comprising:
- transmitting, by a transmitter of a first network node, a first signal on a first frequency band to an electronic device according to a first communication configuration;
- receiving, by a receiver of the first network node, an indication from the electronic device;
- determining, by processing circuitry communicatively coupled to the transmitter and the receiver, that simultaneous uplink operations and downlink operations are permitted on the first frequency band from the first network node and a second frequency band from a second network node based on the indication; and
- transmitting, by the transmitter, a second signal to the electronic device on the first frequency band according to the first communication configuration based on the indication.

16. The method of claim 15, wherein the indication comprises an indication that different portions of antenna circuitry of the electronic device are assigned to the first frequency band and the second frequency band.

17. The method of claim 15, comprising transmitting, by the transmitter, a third signal to the electronic device on the second frequency band according to a second communication configuration based on an additional indication that non-simultaneous uplink operations and downlink operations are to be used.

18. The method of claim 15, comprising generating the first communication configuration, the first communication configuration being configured to cause the transmitter to operate the first frequency band and the second frequency band contiguously in a same frequency band, non-contiguously in the same frequency band, or in different frequency bands.

19. The method of claim 15, comprising assigning the first frequency band to a first antenna panel as opposed to a second antenna panel based on a signal strength of the first signal.

20. The method of claim 15, comprising assigning the first frequency band to a first component carrier and the second frequency band to a second component carrier.

* * * * *